United States Patent
Ieraci

(10) Patent No.: US 11,540,450 B2
(45) Date of Patent: Jan. 3, 2023

(54) WINDOW PLANTER INCLUDING SLIDABLE COMPARTMENTS

(71) Applicant: Bruno Ieraci, Valley Stream, NY (US)

(72) Inventor: Bruno Ieraci, Valley Stream, NY (US)

( * ) Notice: Subject to any disclaimer, the term of this patent is extended or adjusted under 35 U.S.C. 154(b) by 0 days.

(21) Appl. No.: 17/877,094

(22) Filed: Jul. 29, 2022

(65) Prior Publication Data
US 2022/0361417 A1 Nov. 17, 2022

Related U.S. Application Data

(63) Continuation-in-part of application No. 17/323,376, filed on May 18, 2021, which is a continuation-in-part of application No. 17/018,010, filed on Sep. 11, 2020, now Pat. No. 11,006,583.

(51) Int. Cl.
*A01G 9/02* (2018.01)
*A47H 27/00* (2006.01)

(52) U.S. Cl.
CPC ............. *A01G 9/024* (2013.01); *A01G 9/028* (2013.01); *A47H 27/00* (2013.01)

(58) Field of Classification Search
CPC .......... A01G 9/08; A01G 9/027; A01G 9/026; A01G 9/023; A01G 9/02; A01G 2009/003; A01G 9/00; A47G 7/044; A47G 7/045; A47H 27/00; B65D 21/086; B65D 21/08; B65D 11/18; B65F 1/0046; A63H 3/52
USPC ........ 220/4.03, 4.31, 4.32, 8, 534, 543, 544, 220/549, 551
See application file for complete search history.

(56) References Cited

U.S. PATENT DOCUMENTS

| | | | | |
|---|---|---|---|---|
| 324,291 A | * | 8/1885 | Bennett | A47H 27/00 211/88.03 |
| 876,235 A | * | 1/1908 | Quackenboss | A01G 9/02 220/8 |
| 2,064,438 A | * | 12/1936 | Mcnulty | A47H 27/00 160/227 |
| 2,223,074 A | * | 11/1940 | Martin | B65D 21/086 220/8 |
| 3,691,671 A | * | 9/1972 | Kroll | A63H 3/52 220/8 |

(Continued)

OTHER PUBLICATIONS

Non-Final Office Action on corresponding US application (U.S. Appl. No. 17/018,010) dated Dec. 4, 2020.

*Primary Examiner* — Kristen C Hayes
(74) *Attorney, Agent, or Firm* — KOS IP Law LLP; Sean R. Wilsusen, Esq.

(57) ABSTRACT

A window planter includes a first compartment including a first sidewall and a second sidewall. The first compartment is configured to house a first group of plants. A second compartment is slidably coupled to the first compartment. The first compartment includes a first outer sidewall. The second compartment is configured to house a second group of plants separated from the first group of plants by the first sidewall of the first compartment. A third compartment is slidably coupled to the first compartment. The third compartment includes a second outer sidewall. The third compartment is configured to house a third group of plants separated from the first group of plants by the second sidewall. At least the first compartment and the second compartment are configured to be secured to a window frame.

19 Claims, 31 Drawing Sheets

(56) References Cited

U.S. PATENT DOCUMENTS

| | | | | |
|---|---|---|---|---|
| 4,036,369 A * | 7/1977 | Eisenberg | .............. | A47B 45/00 |
| | | | | 248/48.2 |
| 4,909,406 A * | 3/1990 | Wu | ........................ | A45C 11/38 |
| | | | | 220/8 |
| 4,982,857 A * | 1/1991 | Sher | ...................... | B65F 1/0046 |
| | | | | 220/4.03 |
| 5,133,489 A * | 7/1992 | Loew | ...................... | F42B 39/00 |
| | | | | 224/931 |
| 6,209,260 B1 * | 4/2001 | Surette | .................... | A01G 9/02 |
| | | | | 52/12 |
| 7,066,563 B2 * | 6/2006 | Berger | ................ | A47B 88/994 |
| | | | | 312/348.3 |
| 10,501,232 B1 * | 12/2019 | Price | ........................ | A01G 9/02 |
| 2009/0075560 A1 * | 3/2009 | Smith | ...................... | A63H 3/52 |
| | | | | 446/478 |

* cited by examiner

FIG. 32A
FIG. 32B
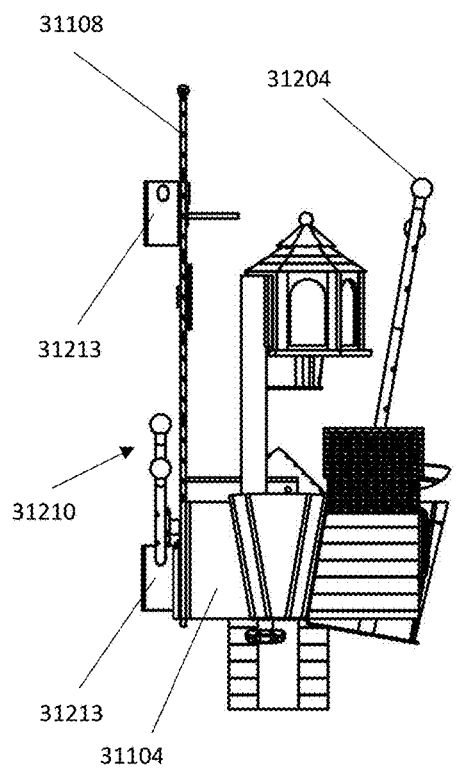
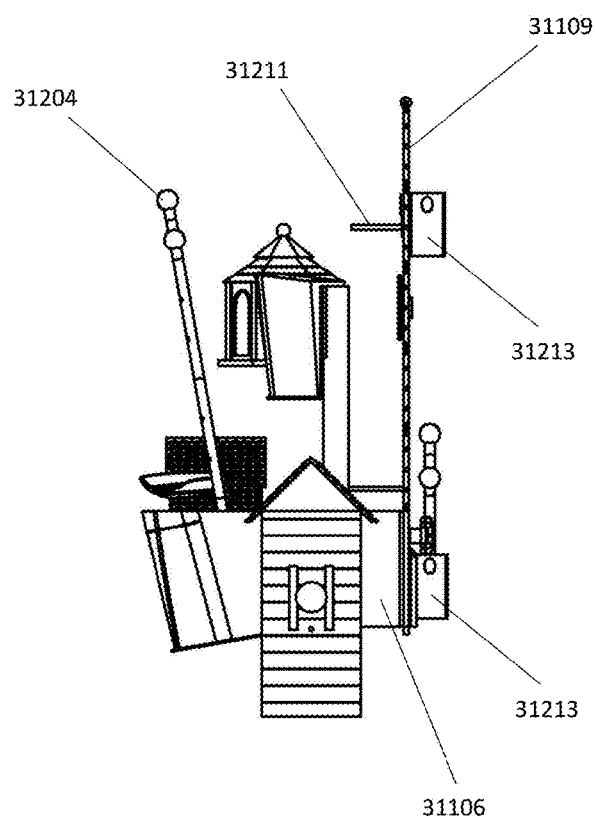

38100

38200

WINDOW PLANTER INCLUDING SLIDABLE COMPARTMENTS

CROSS REFERENCE TO RELATED APPLICATION

The present application is a continuation-in-part of U.S. patent application Ser. No. 17/323,376, filed on May 18, 2021, which is a continuation-in-part of U.S. patent application Ser. No. 17/018,010, filed on Sep. 11, 2020, and issued as U.S. Pat. No. 11,006,583 on May 18, 2021, the entire contents of which are incorporated by reference herein.

FIELD

The present disclosure relates to a window planter and, more specifically, to a window planter including slidable compartments.

BACKGROUND

Window planting systems are often positioned in windows of varied shapes and sizes. Thus, window planters of many fixed sizes are often produced to accommodate windows of different sizes. As an example, individuals living in apartments such as in high rise buildings may desire to create outdoor planting spaces in windows of varying sizes by installing window planters that can be securely coupled to such window frames.

SUMMARY

Provided in accordance with aspects of the present disclosure is a window planter including a first compartment including a first sidewall and a second sidewall. The first compartment is configured to house a first group of plants. A second compartment is slidably coupled to the first compartment. The first compartment includes a first outer sidewall. The second compartment is configured to house a second group of plants separated from the first group of plants by the first sidewall of the first compartment. A third compartment is slidably coupled to the first compartment. The third compartment includes a second outer sidewall. The third compartment is configured to house a third group of plants separated from the first group of plants by the second sidewall. At least the second compartment and the third compartment are configured to be secured to a window frame.

In an aspect of the present disclosure, the second compartment includes a first overhang, and the third compartment includes a second overhang. The first and second overhangs are each configured to be secured in a screen channel of the window frame.

In an aspect of the present disclosure, a first lattice panel extends from the second compartment, and a second lattice panel extends from the third compartment.

In an aspect of the present disclosure, the first lattice panel includes a first overhang configured to be secured to the window frame, and the second lattice panel includes a second overhang configured to be secured to the window frame.

In an aspect of the present disclosure, the first overhang and the second overhang are configured to be secured in a screen channel of the window frame.

In an aspect of the present disclosure, the first lattice panel includes a first attachment bracket at an upper end thereof. The second lattice panel includes a second attachment bracket at an upper end thereof. The first and second attachment brackets are configured to secure the upper ends of the first and second lattice panels to the window frame, or to a window housed in the window frame. The first or second attachment brackets include a Velcro® connection, a hook and eye connection, or an adhesive connection.

In an aspect of the present disclosure, the first compartment includes a false bottom including a plurality of spacers configured to elevate the false bottom above a bottom surface of the first compartment. The false bottom forms a space above the bottom surface of the first compartment. The space is configured to hold water for indirect watering of the first group of plants housed in the first compartment.

In an aspect of the present disclosure, the space includes an aperture formed in a rear wall of the first compartment. The aperture is configured to drain water from the space above the bottom surface of the first compartment. The aperture is positioned to limit an upper level of water stored in the space.

In an aspect of the present disclosure, a first sidewall aperture is formed in the first sidewall of the first compartment, and a second sidewall aperture formed in the second sidewall of the first compartment. The first and second sidewall apertures are configured to pass water from the first compartment to the second and third compartments, respectively.

In an aspect of the present disclosure, the first and second sidewall apertures are in fluid communication with the space above the bottom surface of the first compartment.

In an aspect of the present disclosure, a lid is configured to create a watertight seal at an upper level of the first compartment. A battery may be positioned in the first compartment when the lid covers the first compartment. The battery may be charged by a solar panel.

In an aspect of the present disclosure, at least one hollow compartment is formed in a rear wall of the first compartment, the second compartment or the third compartment. The hollow compartment is configured to store water for watering plants.

In an aspect of the present disclosure, the hollow compartment is in fluid communication with the first compartment, the second compartment, or the third compartment.

In an aspect of the present disclosure, at least one water wicking strand extends between the at least one hollow compartment and the first compartment, the second compartment, or the third compartment. The at least one water wicking strand is configured to draw water out of the at least one hollow compartment at a predetermined rate.

In an aspect of the present disclosure, the at least one water wicking strand includes or is formed of cotton, nylon or acrylic.

In an aspect of the present disclosure, each of the first compartment, the second compartment, and the third compartment includes a hollow compartment formed in the rear surface thereof. Each hollow compartment includes an upper aperture at an upper level thereof configured to fill each hollow compartment with water.

In an aspect of the present disclosure, the window planter includes a first elevated compartment supported above the second compartment. The first elevated compartment is configured to house a fourth group of plants. A second elevated compartment is supported above the third compartment. The second elevated compartment is configured to house a fifth group of plants. A first forward compartment is supported by the second compartment. The first forward compartment is configured to house a sixth group of plants.

A second forward compartment is supported by the third compartment. The second forward compartment is configured to house a seventh group of plants.

In an aspect of the present disclosure, a first side compartment is supported by the first outer sidewall of the second compartment. A second side compartment is supported by the second outer sidewall of the third compartment. The first side compartment is configured to house an eight group of the plants. The second side compartment configured to house a ninth group of plants.

In an aspect of the present disclosure, the first lattice panel is a modular panel including a multiple first lattice members. The second lattice panel is a modular panel including multiple second lattice members.

In an aspect of the present disclosure, the first lattice members each include first apertures and first pins disposed in the first apertures to secure the first lattice members to each other. The second lattice members each include second apertures and second pins disposed in the second apertures to secure the second lattice members to each other.

In an aspect of the present disclosure, at least one of the second compartment, the third compartment, the first forward compartment or the second forward compartment includes a water reservoir.

In an aspect of the present disclosure, a first accessory attachment bracket is supported by the second compartment. A second accessory attachment bracket may also be supported by the third compartment.

In an aspect of the present disclosure, at least one floating compartment is removably coupled with the first lattice panel or the second lattice panel.

In an aspect of the present disclosure, at least one decorative accessory is removably coupled with the first lattice panel or the second lattice panel.

Provided in accordance with aspects of the present disclosure is a window planter including a bird house, a bird feeder, or a bird bath supported by the second compartment or the third compartment.

In an aspect of the present disclosure, a projection extends from the second compartment or the third compartment. The projection supports the bird house, the bird feeder, or the bird bath.

In an aspect of the present disclosure, a rod extends between the first lattice panel and the second lattice panel. The rod secures the window planter to the window frame. The rod may be extendable or modular to varying widths.

In an aspect of the present disclosure, at least one attachment port is configured to be secured to the window frame. The attachment port(s) receive the rod to secure the rod to the window frame.

In an aspect of the present disclosure, a projection extends from the second compartment, the third compartment, the first forward compartment, or the second forward compartment. The projection supports an arm configured to support a portion of a plant positioned above the first compartment, the second compartment, or the third compartment. The projection can also support a decorative figure.

In an aspect of the present disclosure, the projection includes at least one aperture. The aperture supports a plant growing above the first compartment, the second compartment, or the third compartment.

In an aspect of the present disclosure, a support frame is supported by the second compartment or the third compartment. The support frame supports vertical growth of a climbing plant.

In an aspect of the present disclosure, a bird perch extends from one of the lattice panels.

In an aspect of the present disclosure, at least one channel is arranged on the second compartment or the third compartment. The channel slidably receives a support structure or an accessory.

In an aspect of the present disclosure, the channel is formed in the rear surface of the second compartment or the third compartment. The support block is slidably received in the channel. The support block is configured to be coupled with a wall or a window frame.

In an aspect of the present disclosure, the support block has a thickness greater than a thickness of a tightening knob of the second compartment or the third compartment.

In an aspect of the present disclosure, at least one support block is supported by a lattice panel.

In an aspect of the present disclosure, a bird bath is configured to be removably positioned in the first compartment.

BRIEF DESCRIPTION OF THE DRAWINGS

Various aspects and features of the present disclosure are described hereinbelow with reference to the drawings wherein:

FIG. 32A is a first side view of the window planter of FIG. 31;

FIG. 32B is a second side view of the window planter of FIG. 31;

DETAILED DESCRIPTION

Figure 1:
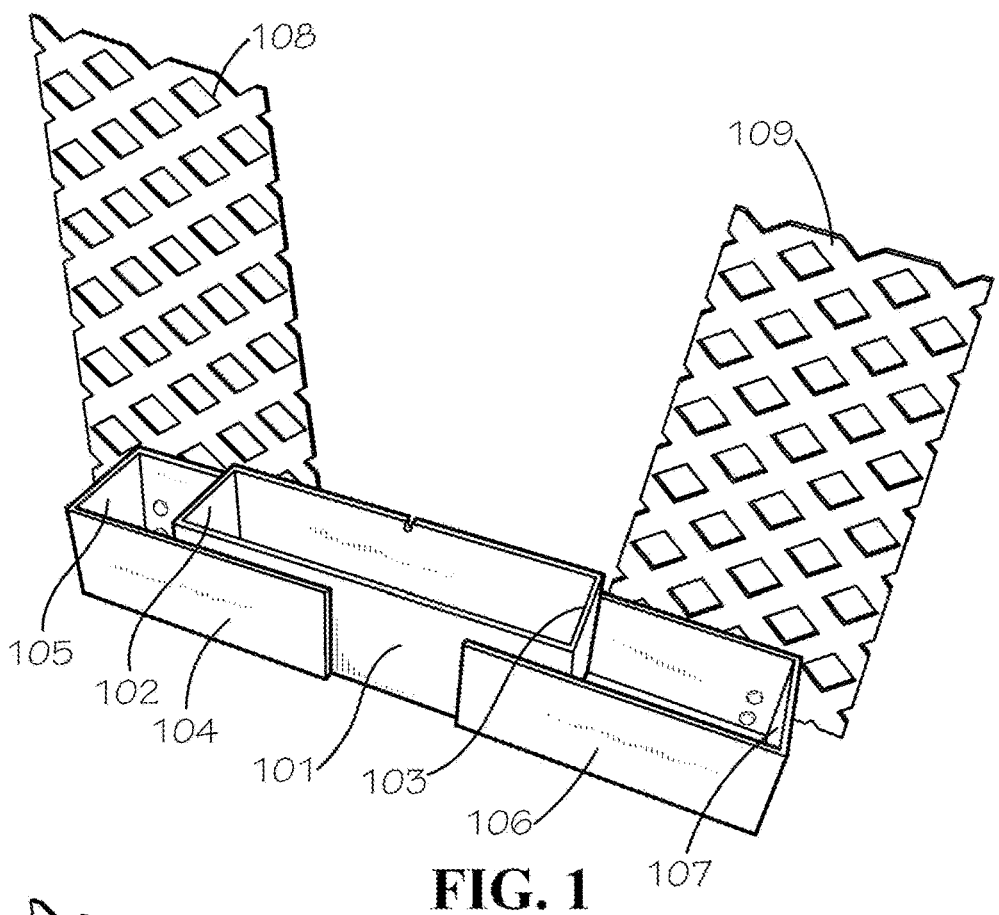
FIG. 1 is a front perspective view of a window planter according to aspects of the present disclosure.
Figure 2:
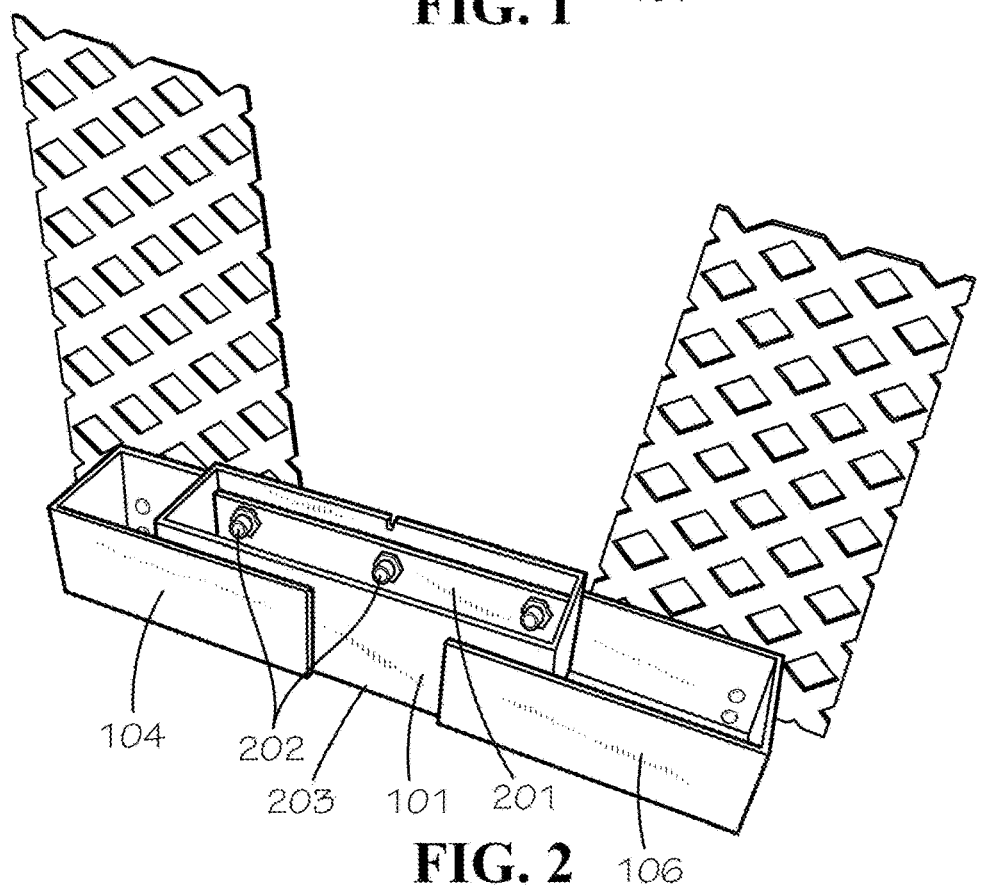
FIG. 2 is a front perspective view of the window planter of FIG. 1 with the false bottom tilted up in the first compartment.
Figure 3:
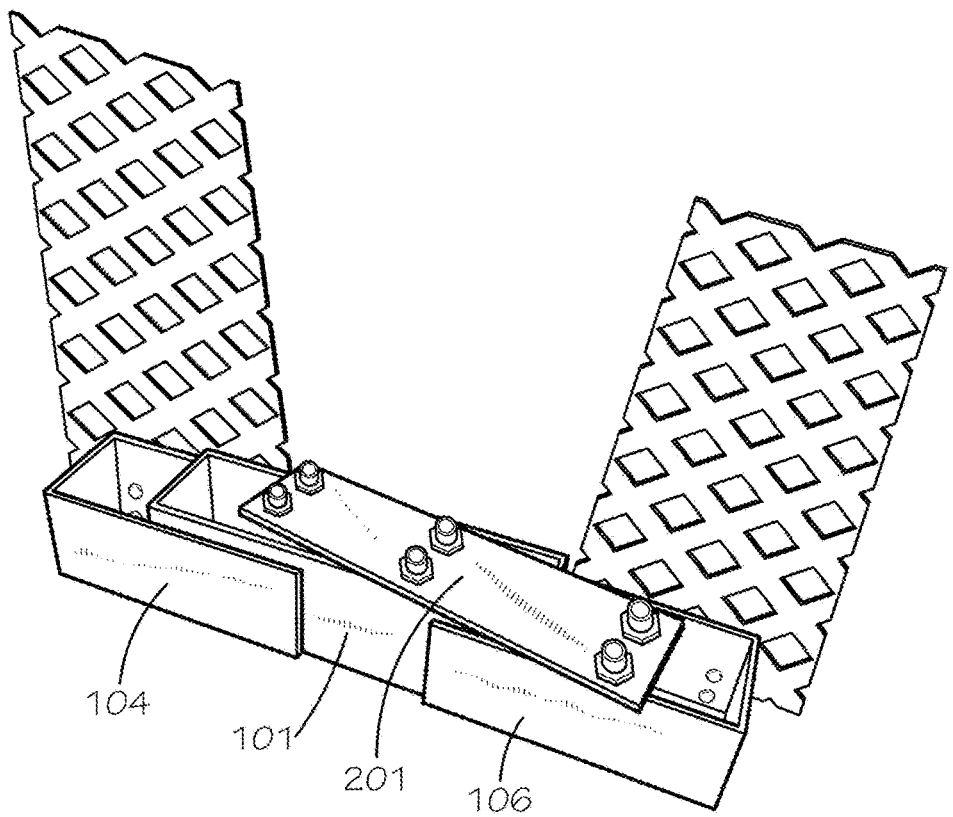
FIG. 3 is a front perspective view of the window planter of FIG. 1 with the false bottom separated from the first compartment.
Figure 4:
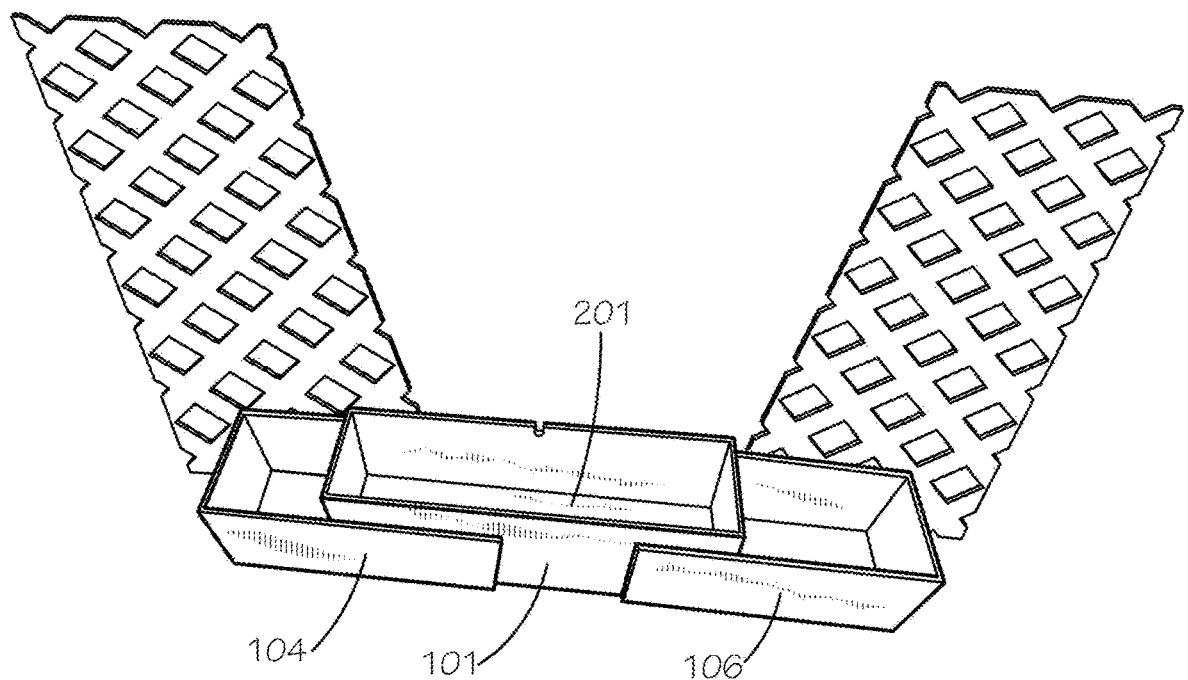
FIG. 4 is a front perspective view of the window planter of FIG. 1 with the false bottom removed.
Figure 5:
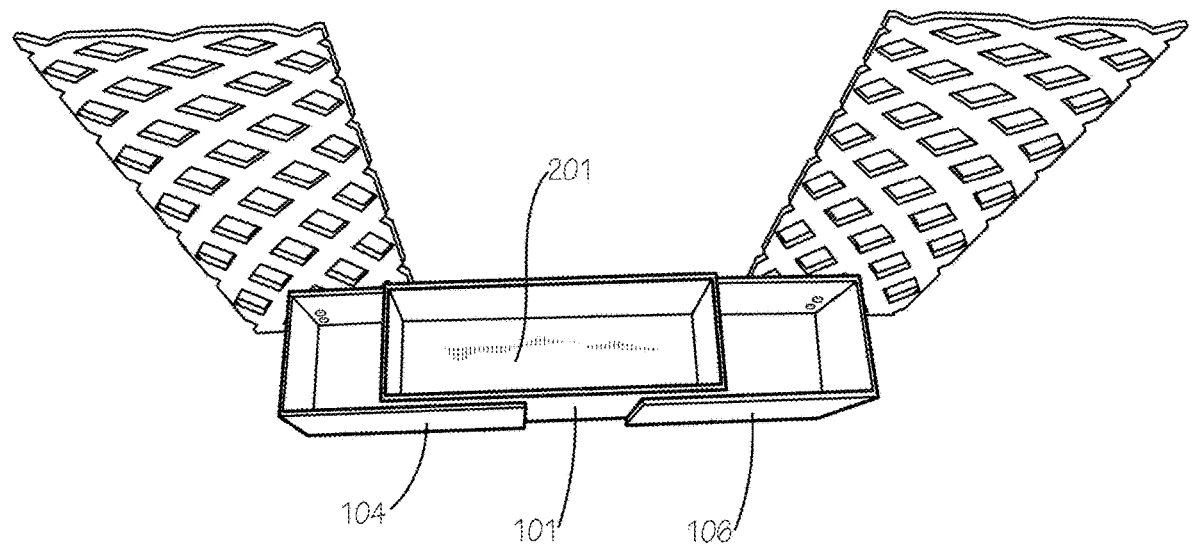
FIG. 5 is a top down view of the window planter of FIG. 1 showing a sliding track of the third compartment.
Figure 6:
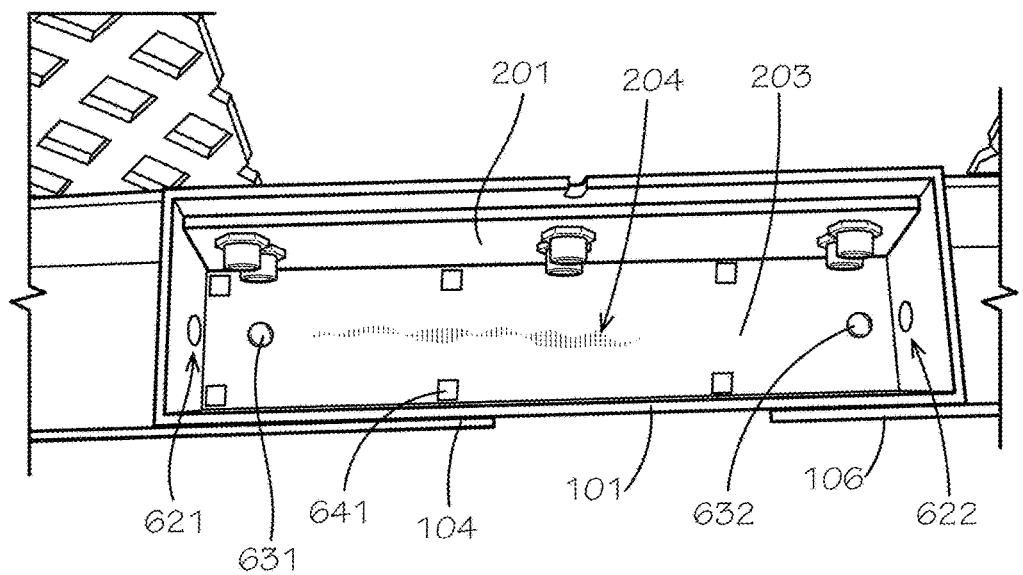
FIG. 6 is an inside view of the first compartment of FIG. 1 with the false bottom tilted up, and first and second bolts extending through the first compartment into the sliding tracks of the second and third compartments.
Figure 7:
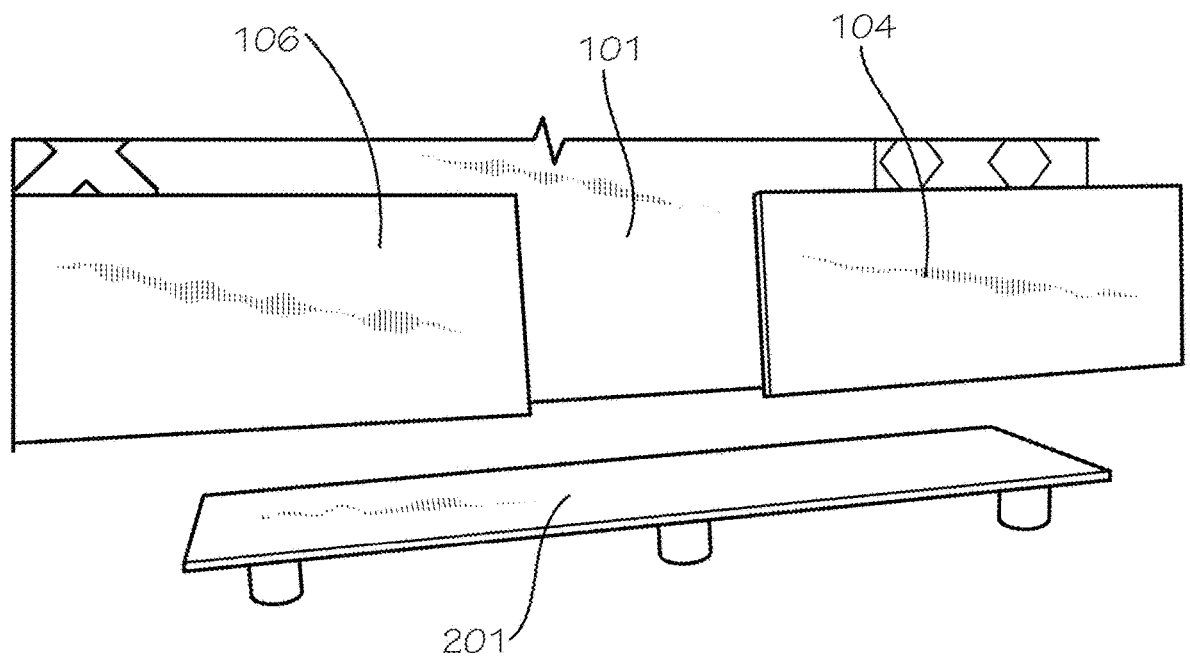
FIG. 7 is a front view of the window planter of FIG. 1 with the false bottom removed.
Figure 8:
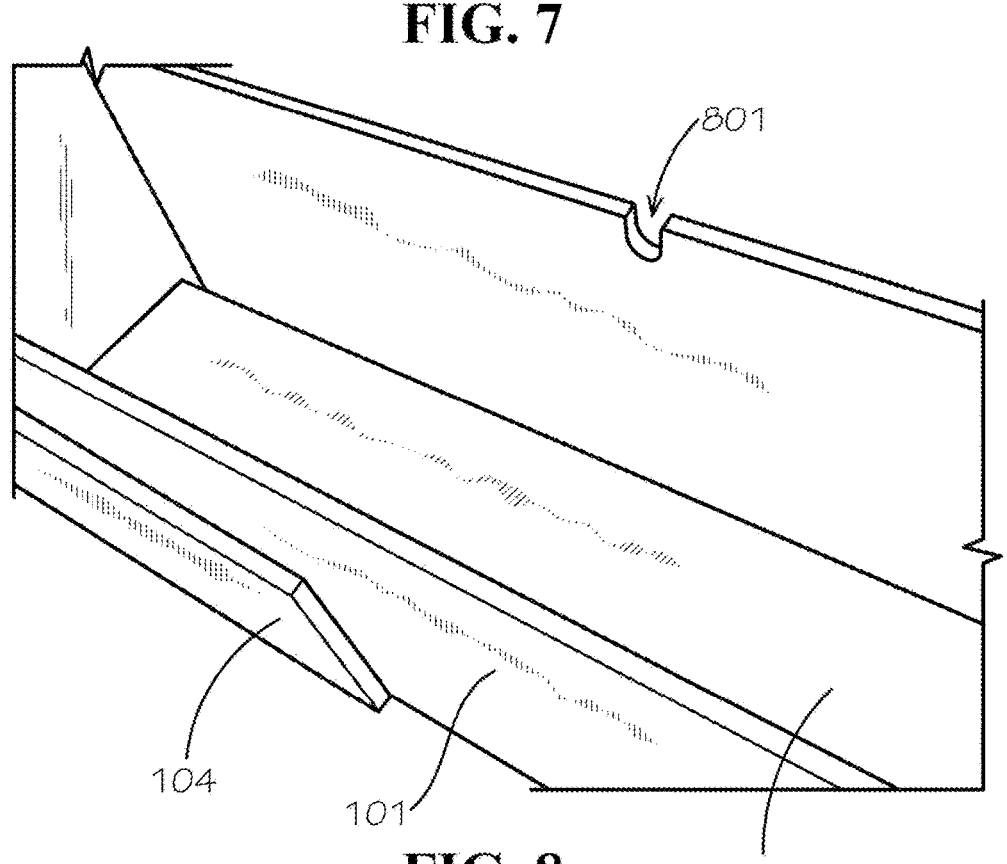
FIG. 8 is an expanded front view of the first compartment of FIG. 1 with the false bottom positioned in the first compartment.
Figure 9:
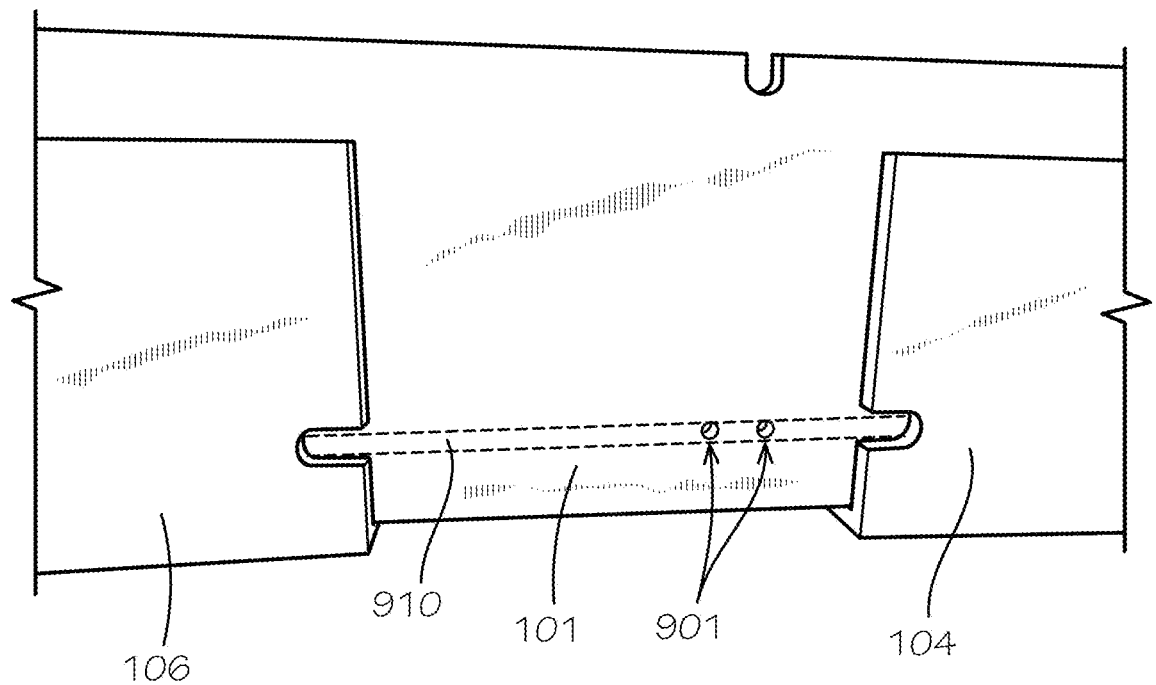
FIG. 9 is a rear view of the window planter of FIG. 1.
Figure 10:
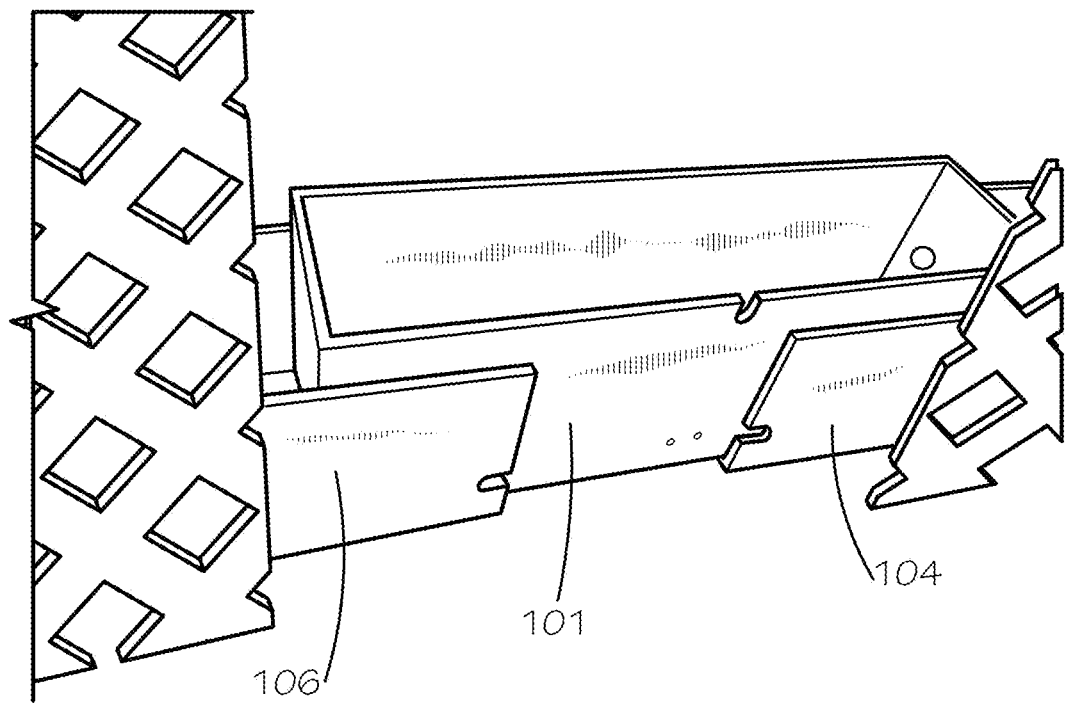
FIG. 10 is a rear perspective view of the window planter of FIG. 1.

The terms "about," substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Referring to FIGS. 1 to 19, a window planter includes a first compartment 101 including a first sidewall 102 and a second sidewall 103. The first compartment 101 is configured to house a first group of plants. The groups of plants described herein may be a single plant or multiple plants. The plants can include ornamental plants such as annual or perennial plants. Alternatively, herbs can be planted. Each plant or group of plants can be separated from each other by being planted in the different compartments described herein.

A second compartment 104 is slidably coupled to the first compartment 101. The second compartment 104 includes a first outer sidewall 105. The second compartment 104 is configured to house a second group of plants separated from the first group of plants by the first sidewall 102 of the first compartment 101. A third compartment 106 is slidably coupled to the first compartment 101. The third compartment 106 includes a second outer sidewall 107. The third compartment 106 is configured to house a third group of plants separated from the first group of plants by the second sidewall 103. At least the second compartment 104 and the third compartment 106 are configured to be secured to a window frame.

In use, the second and third compartments 104, 106 are slid outwardly from the first compartment 101 to approximately fit inside a window frame into which the window planter is being installed. The second and third compartments 104, 106 are secured in place with respect to the first compartment and prevented from sliding inwardly (e.g., via the nut and bolt system described in more detail below). At least the second and third compartments 104, 106 are then secured to the window frame, as described herein. Thus, the window planter is prevented from moving laterally, or in a front to back direction, to secure the window planter to a window frame allow planting therein, as desired.

Figure 16:
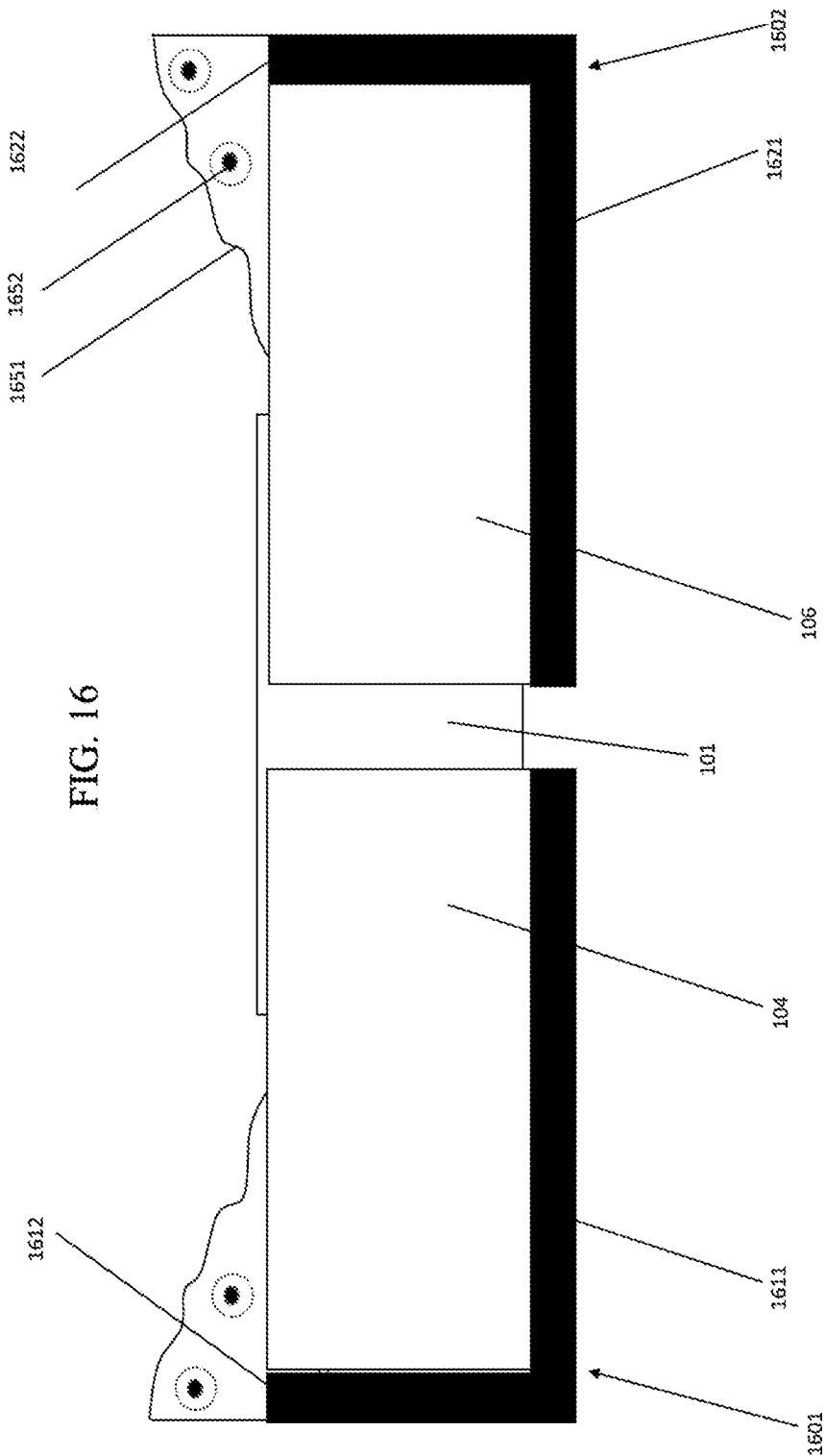
FIG. 16 is a rear view of the window planter of FIG. 1, with the lattice panels omitted, and including overhangs extending from the second and third compartments.
Figure 17:
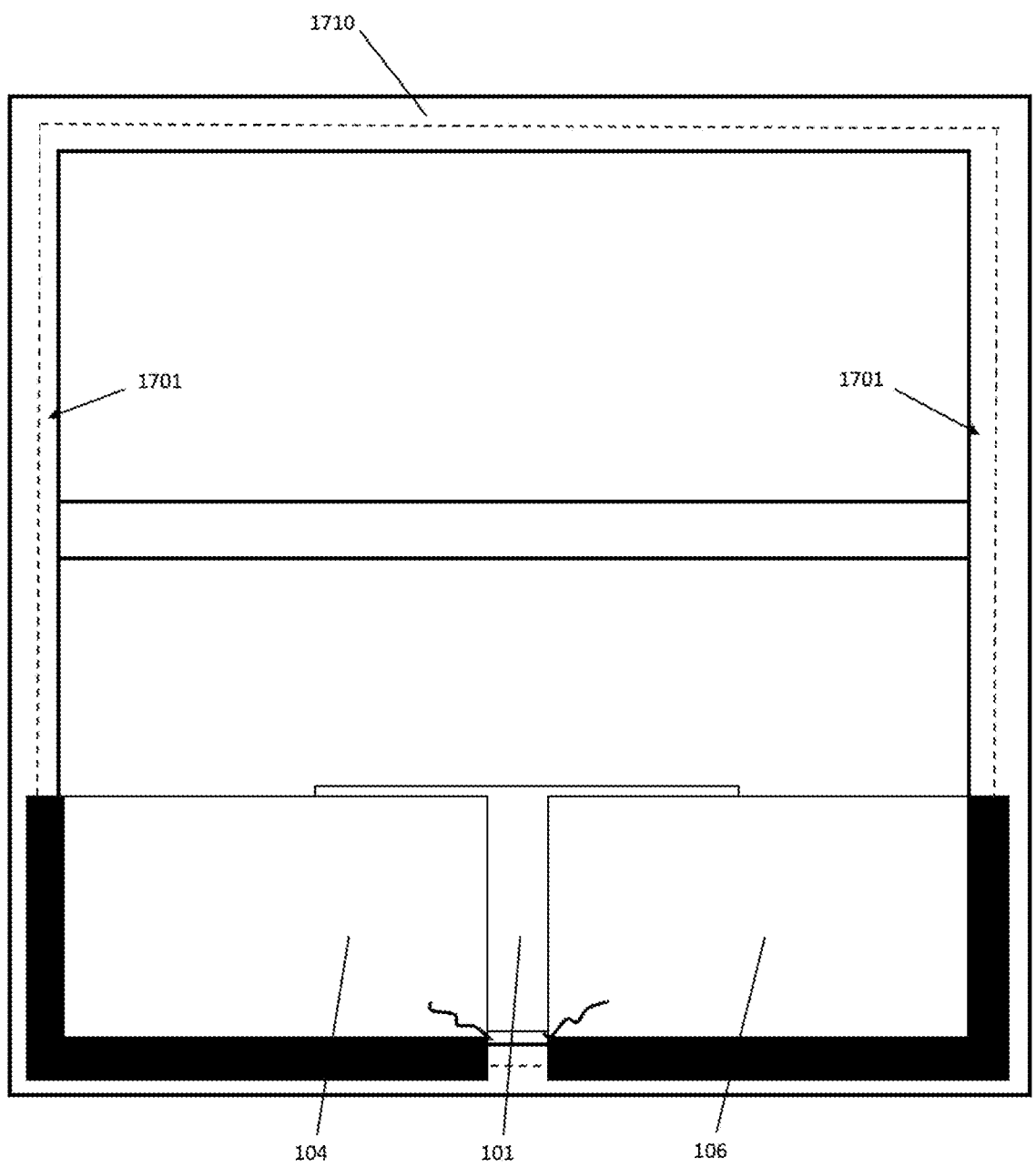
FIG. 17 is a cross-sectional view of the window planter of FIG. 16 with the overhangs positioned in a screen channel of a window.
Figure 18:
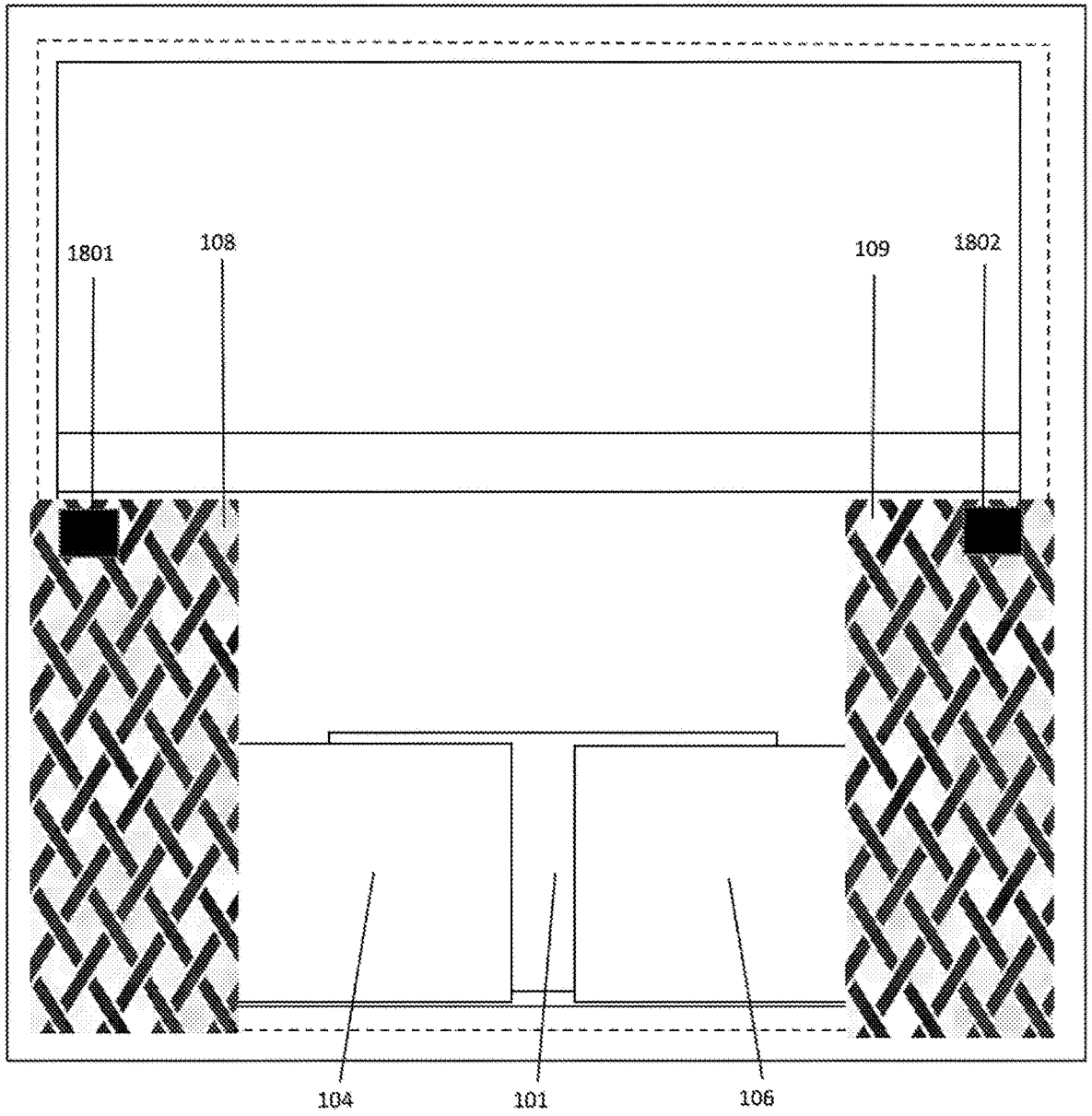
FIG. 18 is a cross-sectional view of the window planter of FIG. 1 with the lattice panels overhanding the front and rear panels and positioned in a screen channel of a window.
Figure 19:
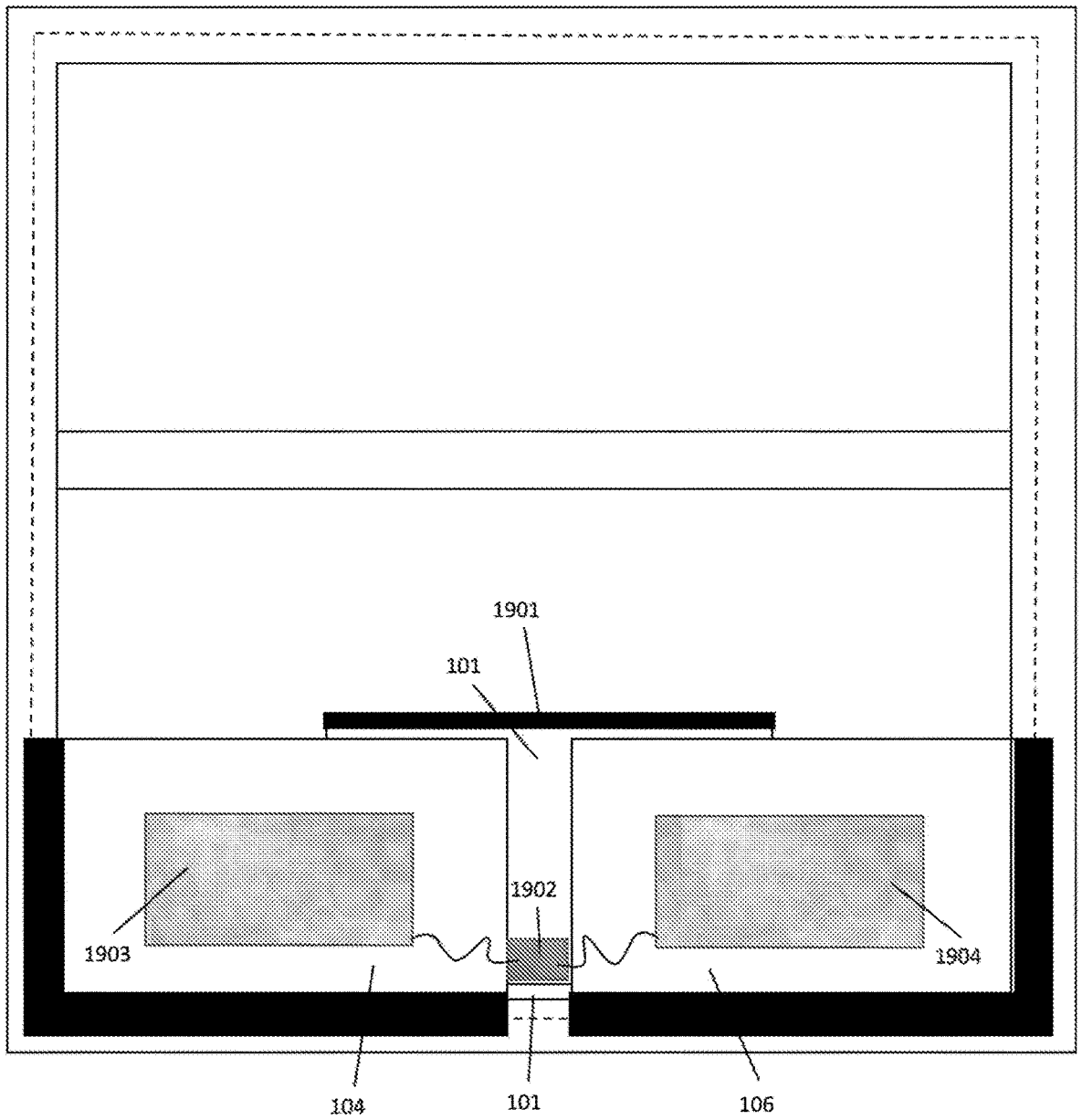
FIG. 19 illustrates the window planter of FIG. 1 with a lid, battery, and solar panels according to aspects of the present disclosure.

In an aspect of the present disclosure, the second compartment 104 includes a first overhang 1601, and the third compartment 106 includes a second overhang 1602 (see, e.g., FIG. 16). The first and second overhangs 1601 and 1602 are each configured to be secured in a screen channel 1701 of the window frame 1710 (see, e.g., FIG. 17). The first overhang 1601 may include a horizontal overhang 1611 and/or a vertical overhang 1612, and the second overhang 1602 may similarly include a horizontal overhang 1621 and/or a vertical overhang 1622.

In an aspect of the present disclosure, a first lattice panel 108 extends from the second compartment 104, and a second lattice panel 109 extends from the third compartment 106.

Figure 11:
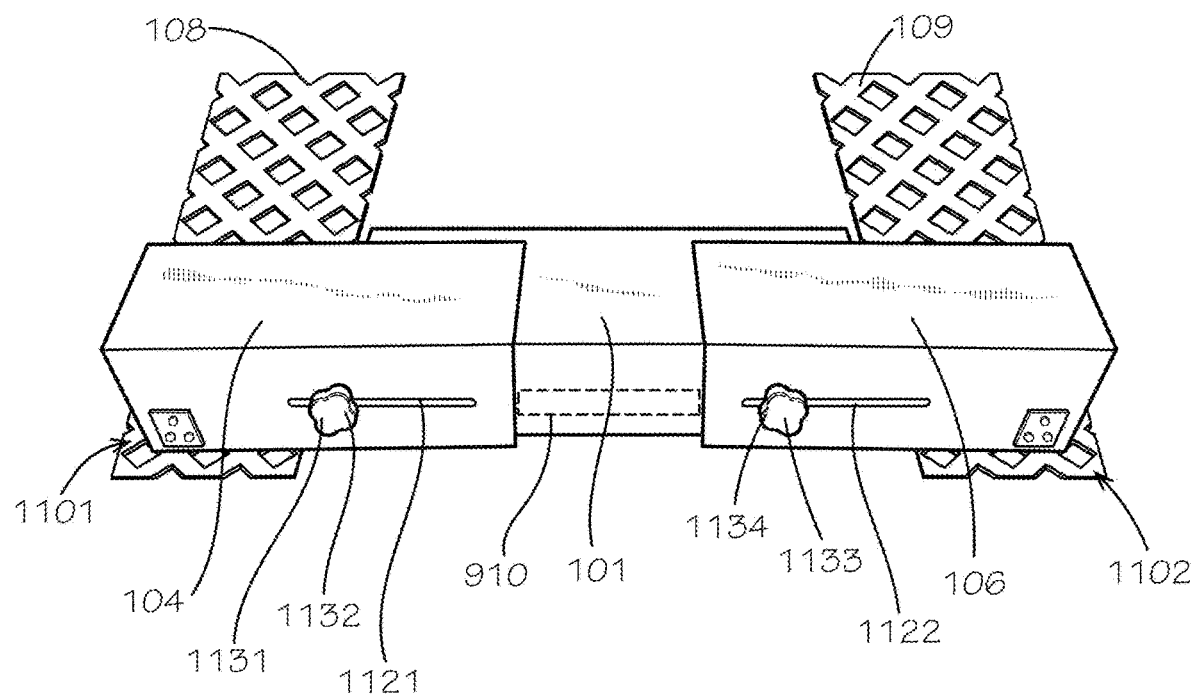
FIG. 11 is a bottom view of the window planter of FIG. 1.
Figure 12:
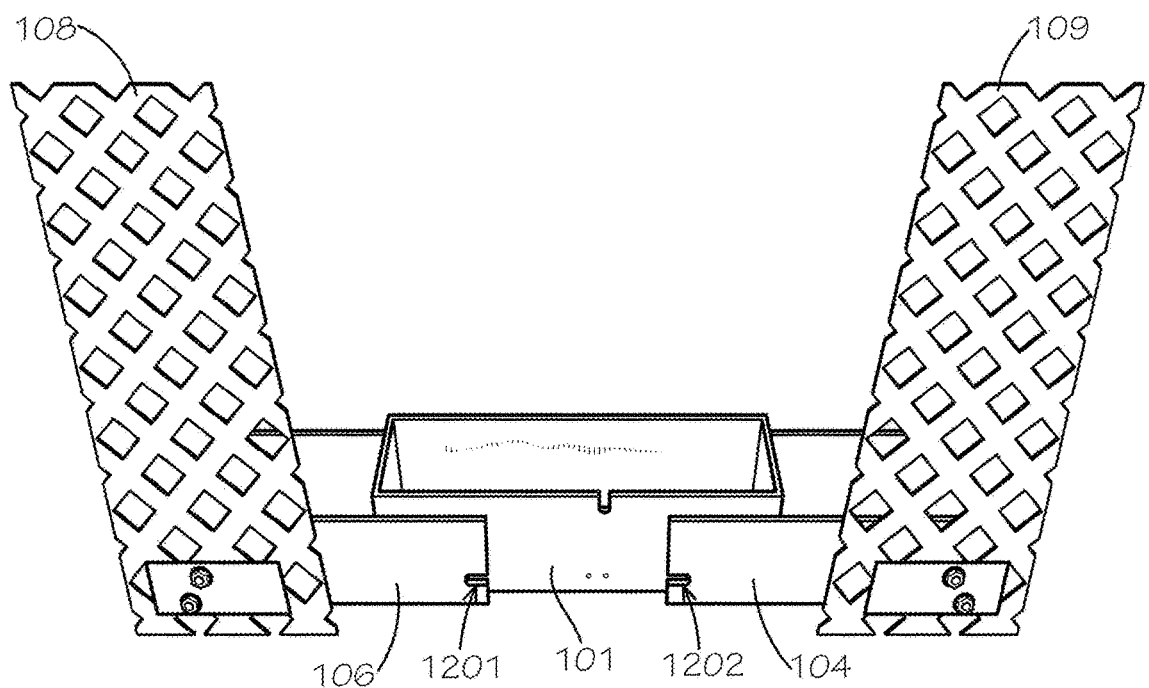
FIG. 12 is a rear view of the window planter of FIG. 1.
Figure 13:
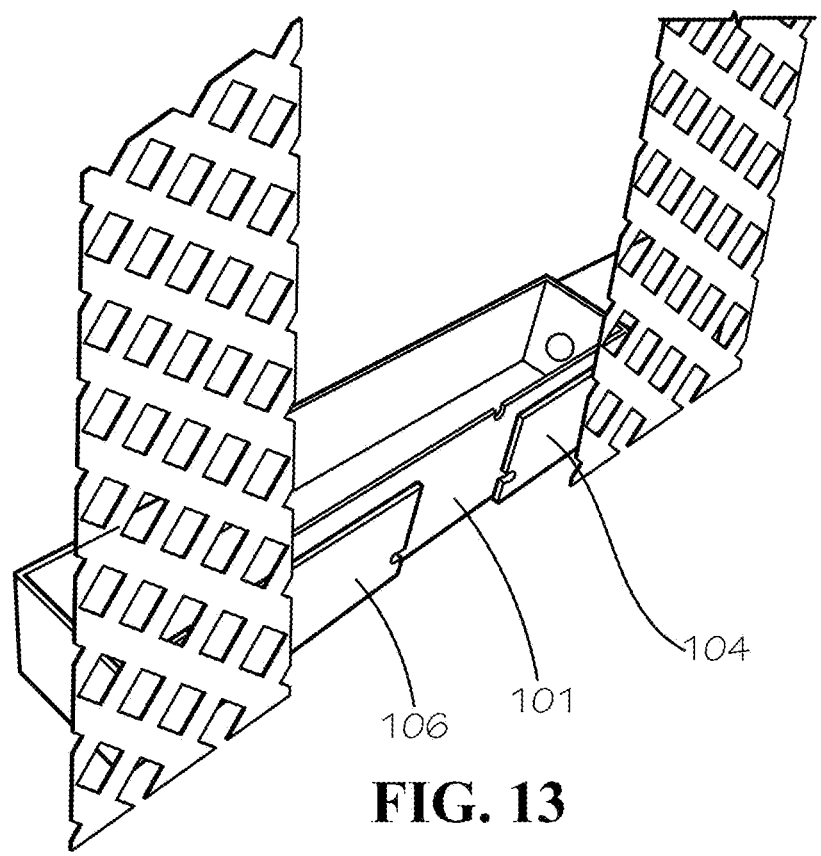
FIG. 13 is a rear, perspective view of the window planter of FIG. 1.
Figure 14:
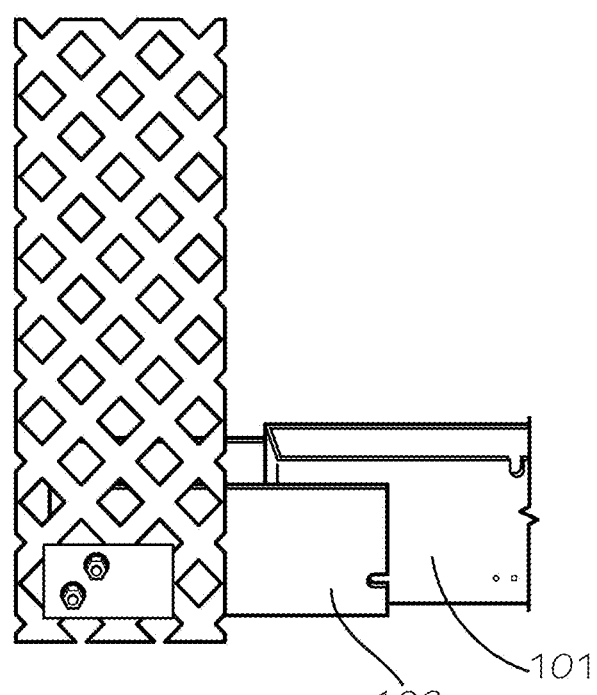
FIG. 14 is a partial rear view of the window planter of FIG. 1.
Figure 15:
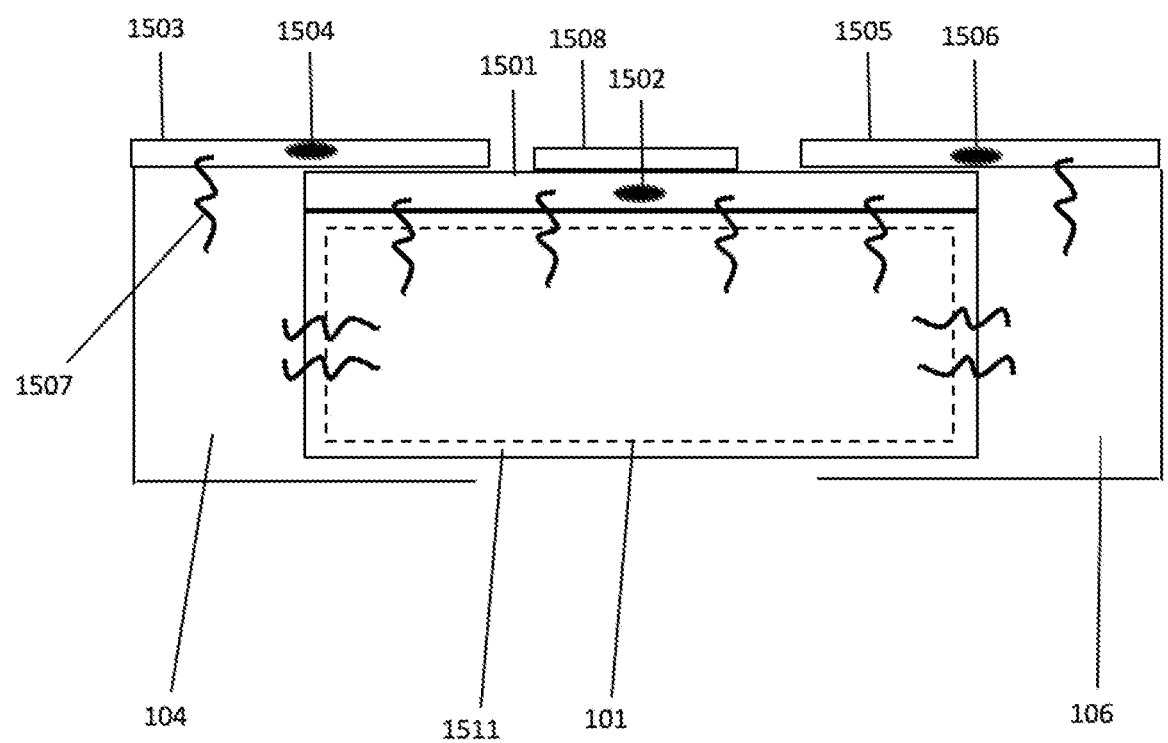
FIG. 15 is a top down view of the window planter of FIG. 1, including hollow rear components and water wicking strands.

In an aspect of the present disclosure, the first lattice panel 108 includes a first overhang 1101 configured to be secured to the window frame 1710, and the second lattice panel includes a second overhang 1102 configured to be secured to the window frame 1710 (see, e.g., FIG. 11). Similar to the overhang described with reference to FIG. 16, the first and second overhangs 1101 and 1102 may each include horizontal and vertical overhangs configured to be secured in the screen channel 1701 of the window frame 1710. The overhangs described herein positioned in screen channel 1701 of the window frame 1710 prevent movement of the window planter, while still allowing opening and closing of the window positioned behind the window planter.

In an aspect of the present disclosure, the first lattice panel 108 includes a first attachment bracket 1801 at an upper end thereof. The second lattice panel 109 includes a second attachment bracket 1802 at an upper end thereof. The first and second attachment brackets 1801 and 1802 are configured to secure the upper ends of the first and second lattice panels 108 and 109 to the window frame 1710, or to a window housed in the window frame 1710. The first or second attachment brackets 1801 and 1802 may include a Velcro® connection, a hook and eye connection, or an adhesive connection. The attachment brackets 1801 and 1802 can be employed as an additional attachment mechanism for securing the window planter to a desired window frame. In particular, the attachment brackets 1801 and 1802 prevent forward movement of the lattice panels 108, 109.

In an aspect of the present disclosure, the first compartment includes a false bottom 201 including a plurality of spacers 202 configured to elevate the false bottom 201 above a bottom surface 203 of the first compartment 101. The false bottom 201 forms a space 204 above the bottom surface 203 of the first compartment 101. The space 204 is configured to hold water for indirect watering of the first group of plants housed in the first compartment 101. The space 204 also receives water dripped down from above and can prevent root rot by preventing the roots from sitting in standing water.

In an aspect of the present disclosure, the space includes an aperture 901 formed in a rear wall of the first compartment 101. The aperture 901 is configured to drain water from the space 204 above the bottom surface 203 of the first compartment 101. The aperture 901 is positioned to limit an upper level of water stored in the space 204.

In an aspect of the present disclosure, a first sidewall aperture 621 is formed in the first sidewall 102 of the first compartment 101, and a second sidewall aperture 622 formed in the second sidewall 103 of the first compartment 101. The first and second sidewall apertures 621 and 622 are configured to pass water from the first compartment 101 to the second and third compartments 104 and 106, respectively.

In an aspect of the present disclosure, the first and second sidewall apertures 621 and 622 are in fluid communication with the space 204 above the bottom surface 203 of the first compartment 101.

In an aspect of the present disclosure, a lid 1901 is configured to create a watertight seal at an upper level of the first compartment 101. Creating a watertight seal can be employed to create a clear dry space within the first compartment 101, which may be employed when the window planter is employed for uses other than holding plants, such as displaying holiday lights or decorations, as described herein. A battery 1902 may be positioned in the first compartment 101 when the lid 1901 covers the first compartment 101. The battery 1902 may be a rechargeable lithium-ion battery, as an example. While a separate lid 1901 may be employed, the false bottom 201 may also be employed as a lid for the first compartment. The birdbath 35202 may also be employed as a lid for the first compartment (see, e.g., FIG. 35).

The battery 1902 may be charged by a solar panel 1903 and/or 1904. As an example, the second compartment 104 and/or the third compartment 106 may each support solar panel 1903 or solar panel 1904 or the solar panels 1903 or 1904 can be supported by lattice panel(s) (e.g., lattice panels 108 or 109).

In an aspect of the present disclosure, at least one hollow compartment 1501, 1502, or 1503 is formed in a rear wall of the first compartment 101, the second compartment 104 or the third compartment 106. The hollow compartment 1501, 1502, or 1503 is configured to store water for watering plants.

In an aspect of the present disclosure, the hollow compartment 1501, 1502, or 1503 is in fluid communication with the first compartment 101, the second compartment 104 or the third compartment 106.

In an aspect of the present disclosure, at least one water wicking strand 1507 extends between the at least one hollow compartment 1501, 1502, or 1503 and the first compartment 101, the second compartment 104 or the third compartment 106. The at least one water wicking strand 1507 is configured to draw water out of the at least one hollow compartment 1501, 1502, or 1503 at a predetermined rate.

In an aspect of the present disclosure, the at least one water wicking strand 1507 includes or is formed of cotton, nylon or acrylic.

In an aspect of the present disclosure, each of the first compartment 101, the second compartment 104, and the third compartment includes a hollow compartment formed in the rear surface thereof. Each hollow compartment includes an upper aperture 1502, 1504, or 1506 at an upper level thereof configured to fill each hollow compartment with water.

Sliding tracks 1121 and 1122 (see, e.g., FIG. 11) respectively formed in the second and third compartments 104 and 106 allow the second and third compartments 104 and 106 to slide with respect to the first compartment 101 while remaining coupled to the first compartment 101 by a bolt 631 or 632 (see, e.g., FIG. 6) extending from inside the first compartment 101 through the sliding tracks 1121 or 1122 of the second and third compartments 104 and 106. A nut 1131 or 1133 can be tightened about each of the bolts 631 or 632 to secure the second and third compartments 104 or 106 in a desired position with respect to the first compartment 101t. Each bolt 631 or 632 may include a hand knob 1132 or 1134 to allow hand tightening of the bolt 631 or 632.

A notch 801 (see, e.g., FIG. 8) may be formed in a rear surface of the first compartment 101 (e.g., to allow access to the battery 1902) to connect wires for Christmas lights, etc.

As an example, the window planter described herein may be employed for displaying ornamental lighting or decorations such as holiday lights or decorations (e.g., along lattice panels 108, 109.

Notches 1201, 1202 (see, e.g., FIG. 12) may also be formed in the rear surfaces of the second and third compartments 104, 106 to allow wiring to extend into the second or third compartments 104, 106.

In an aspect of the present disclosure, the false bottom 201 may be formed of a material that allows water to flow therethrough in only a single direction. For example, water may flow into space 204 through an upper surface of the false bottom 201. However, if the false bottom 201 is inverted (e.g., to be used as a top of the first compartment 101), then water would not flow through a bottom surface of the false bottom 201 which would face in an upward direction when the false bottom 201 is used as a top for the first compartment 101.

In an aspect of the disclosure, the spacers 202 may be omitted and the false bottom 201 may rest on a plurality of protrusions 641 extending from an inner surface of the first compartment 101. Protrusions 641 may be formed intermittently around the bottom reason of the first compartment 101 (e.g., in the corners thereof), or a continuous protrusion may be formed around substantially an entire perimeter of the first compartment 101.

In an aspect of the disclosure, the false bottom 201 may be coupled to a "C" shaped channel 1511 formed at an upper level of the first compartment 101. The "C" shaped channel 1511 is configured to create a watertight seal at the top level of the first compartment 101 between the false bottom 201 which is, in this instance, used as a top for the first compartment 101 and the inner side of the first compartment 101. The "C" shaped channel 1511 may protrude slightly, while still allowing the false bottom 201 to be maneuvered into the lower region of the first compartment 101.

In an aspect of the disclosure, a plant food dispenser 1508, such as a liquid plant food dispenser may be formed at a back surface of at least one of the hollow compartments (e.g., 1502), and may be in fluid communication with at least one of the hollow compartments to provide nutrients to the plants disposed in any of compartments 101, 104, 106.

In an aspect of the disclosure, a back support 1651 may extend from an upper surface of compartments 104, 106 for removably coupling a decorative lattice panel (see, e.g., 108, 109) to the compartments 104, 106, respectively. Each back support 1651 may include at least one attachment orifice 1652 (e.g., a screw hole). Each attachment orifice 1652 may include a decorative border therearound, such as a floral pattern decorative border.

In an aspect of the disclosure, a lateral movement blocking bar (see, e.g., 910) may prevent inward lateral movement of compartments 104, 106, thus preventing the window planter from becoming dislodged from a window frame. The position of the lateral-movement blocking bar 910 may vary. For example, the lateral-movement blocking bar 910 may be positioned at a back surface of the first compartment 101 in slots 911, 912 (see, e.g., FIG. 9), or at a bottom surface of first compartment 101 (see, e.g., FIG. 11). The lateral-movement blocking bar 910 may be a bar that is shaped and dimensioned to fit into the screen channel 1701 between overhangs 1611 and 1621. The lateral-movement blocking bar 910 may be manufactured as a customizable bar that can be cut to a size of a particular window frame to fit a space between overhangs 1611 and 1621 in a particular window.

In an aspect of the present disclosure, the overhangs, 1611, 1612, 1622, 1622 may each be extendable to project into screen channels of varying sizes or depths, and for window frames of varying sizes. For example, an additional extension piece may be added to any of overhangs 1611, 1612, 1622, 1622 to project into screen channels of varying sizes or depths, and for window frames of varying sizes.

Unless otherwise indicated below, window planters 2000 and 2100 are substantially the same as the window planter described above with reference to FIGS. 1 to 19, and thus duplicative descriptions may be omitted below.

Figure 20:
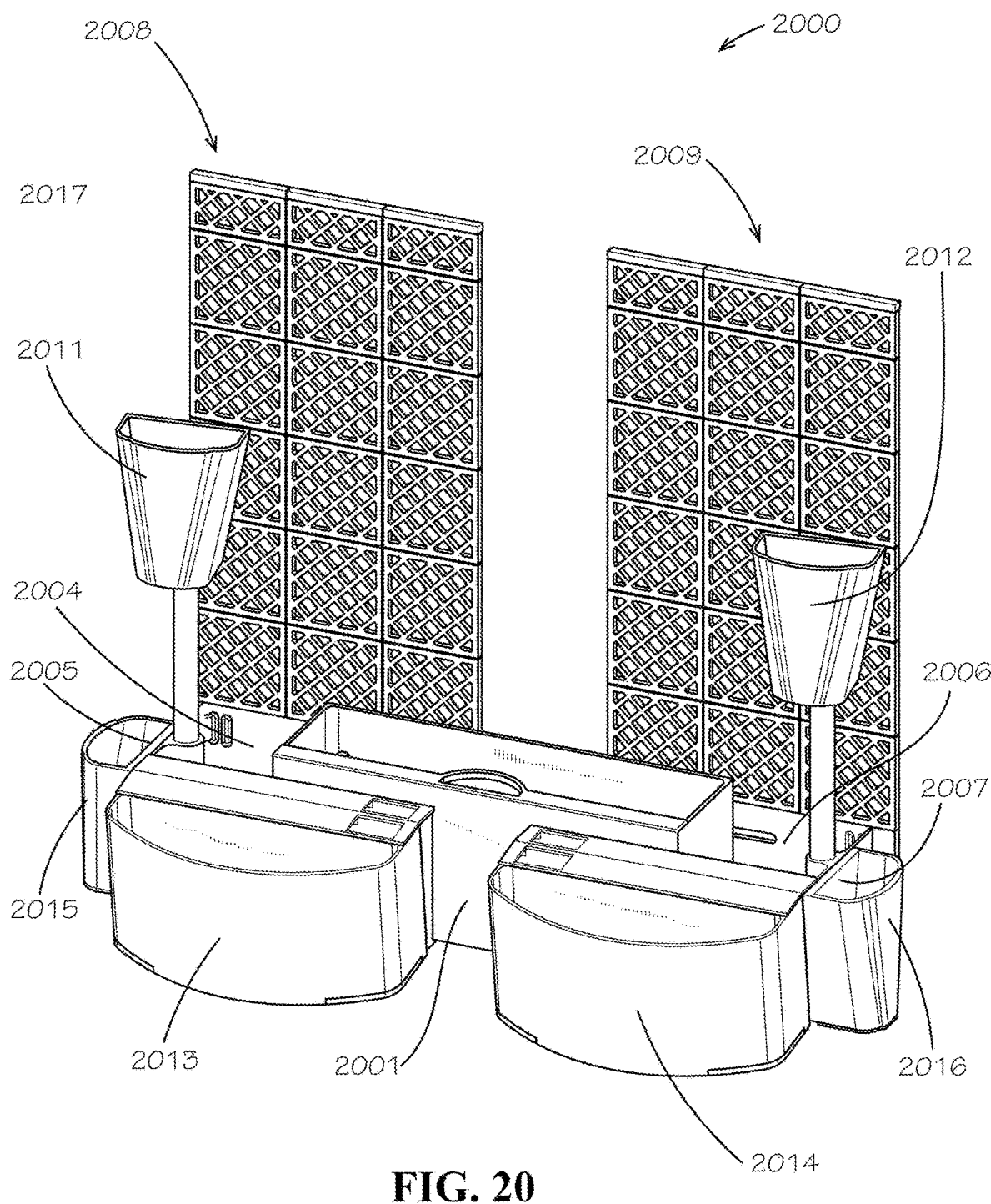
FIG. 20 is a front perspective view of another window planter according to aspects of the present disclosure.

Referring to FIG. 20, window planter 2000 includes a first elevated compartment 2011 supported above the second compartment 2004. The first elevated compartment 2011 is configured to house a fourth group of plants. A second elevated compartment 2012 is supported above the third compartment 2006. The second elevated compartment 2012 is configured to house a fifth group of plants. A first forward compartment 2013 is supported by the second compartment 2004. The first forward compartment 2013 is configured to house a sixth group of plants. A second forward compartment 2014 is supported by the third compartment 2006. The second forward compartment 2014 is configured to house a seventh group of plants.

Figure 22A:
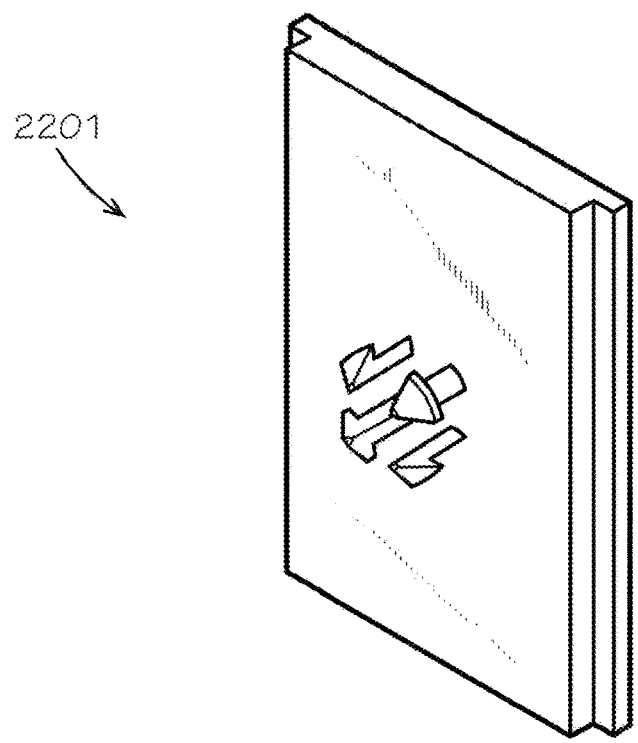
FIG. 22A illustrates an exemplary attachment bracket according to aspects of the present disclosure.

Each of the first elevated compartment 2011, second elevated compartment 2012, first forward compartment 2013, and second forward compartment 2014 can be removably secured to the window planter 2000. For example, an attachment bracket (see, e.g., bracket 2201 in FIG. 22A) can be used to slidably secure the first elevated compartment 2011, second elevated compartment 2012, first forward compartment 2013, and second forward compartment 2014 to window planter 2000.

In an aspect of the present disclosure, a first side compartment 2015 is supported by the first outer sidewall 2005 of the second compartment 2004. A second side compartment 2016 is supported by the second outer sidewall 2007 of the third compartment 2006. The first side compartment 2015 is configured to house an eight group of the plants. The second side compartment 2016 is configured to house a ninth group of plants.

The first lattice panel 2008 is a modular panel including multiple first lattice members 2017. The second lattice panel 2009 is also a modular panel including multiple second lattice members 2017. The modular configuration allows lattice panels of different shapes and sizes to be formed (e.g., to accommodate windows of different sizes and shapes).

Figure 28A:
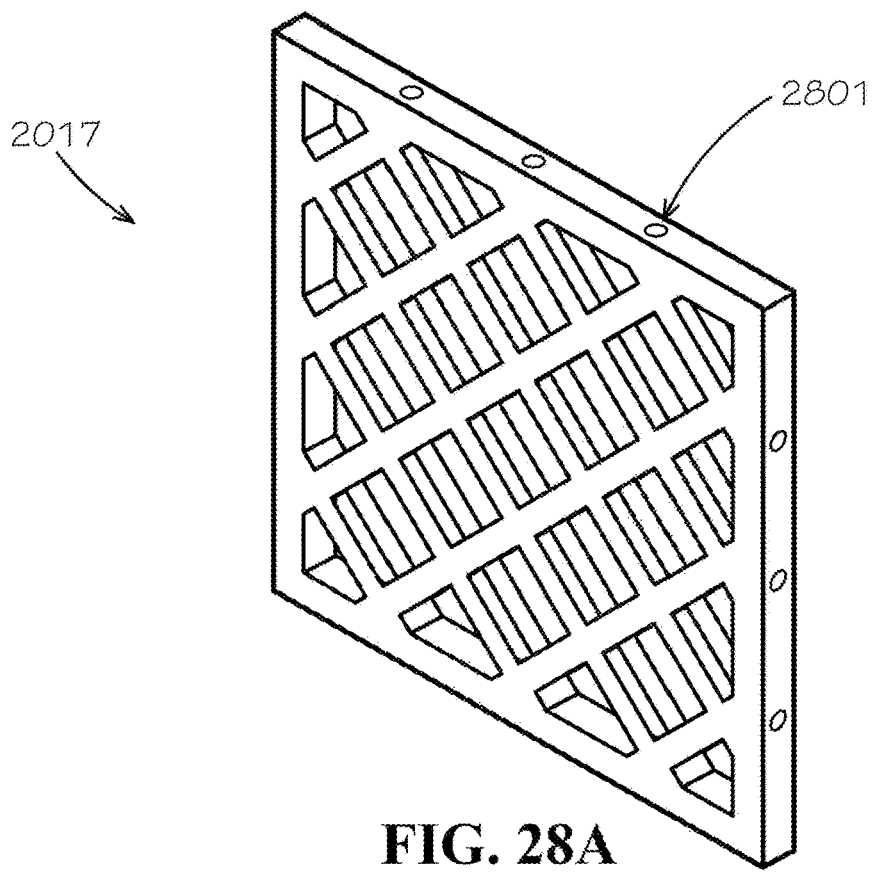
FIGS. 28A and 28B each illustrate a lattice member of a modular lattice panel of the window planters of FIG. 20 or 21 according to aspects of the present disclosure.
Figure 28B:
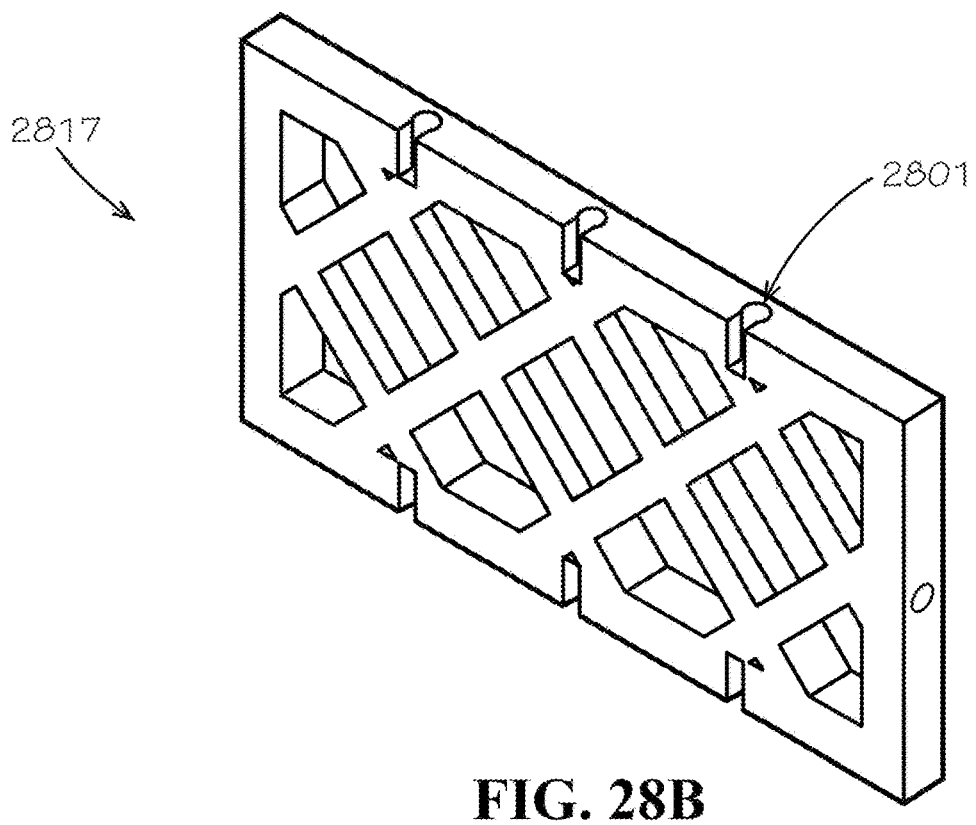
Figure 29A:
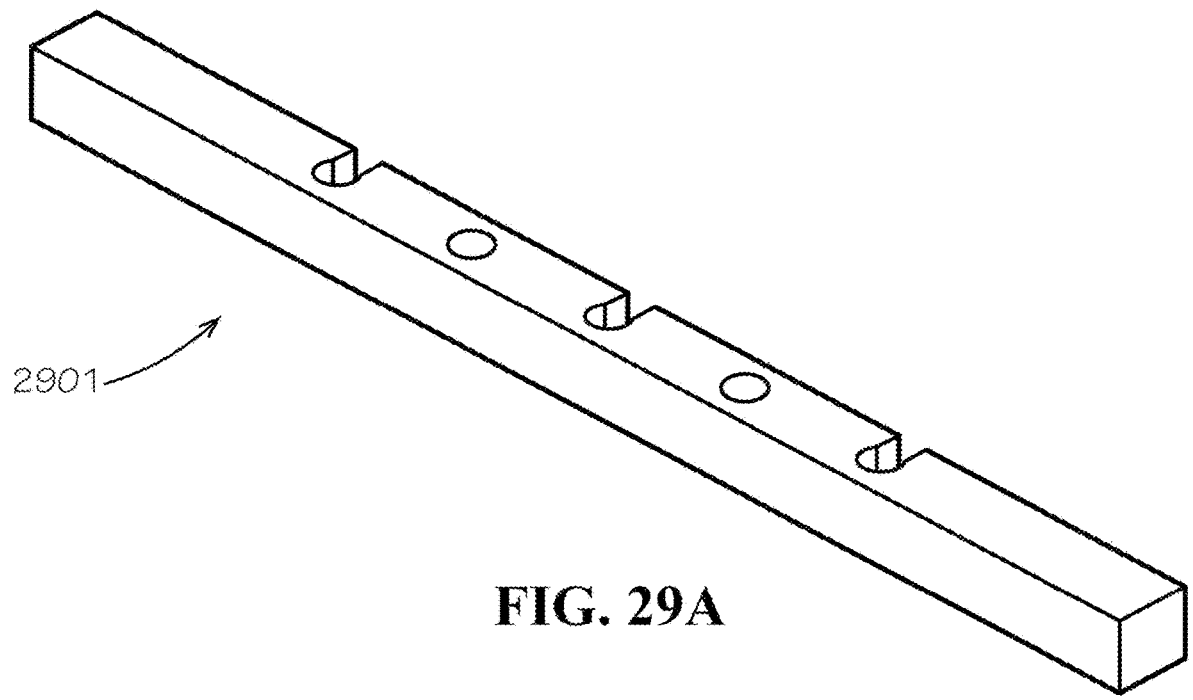
FIGS. 29A and 29B each illustrate a top member of the modular lattice panel of the window planters of FIG. 20 or 21 according to aspects of the present disclosure.
Figure 29B:
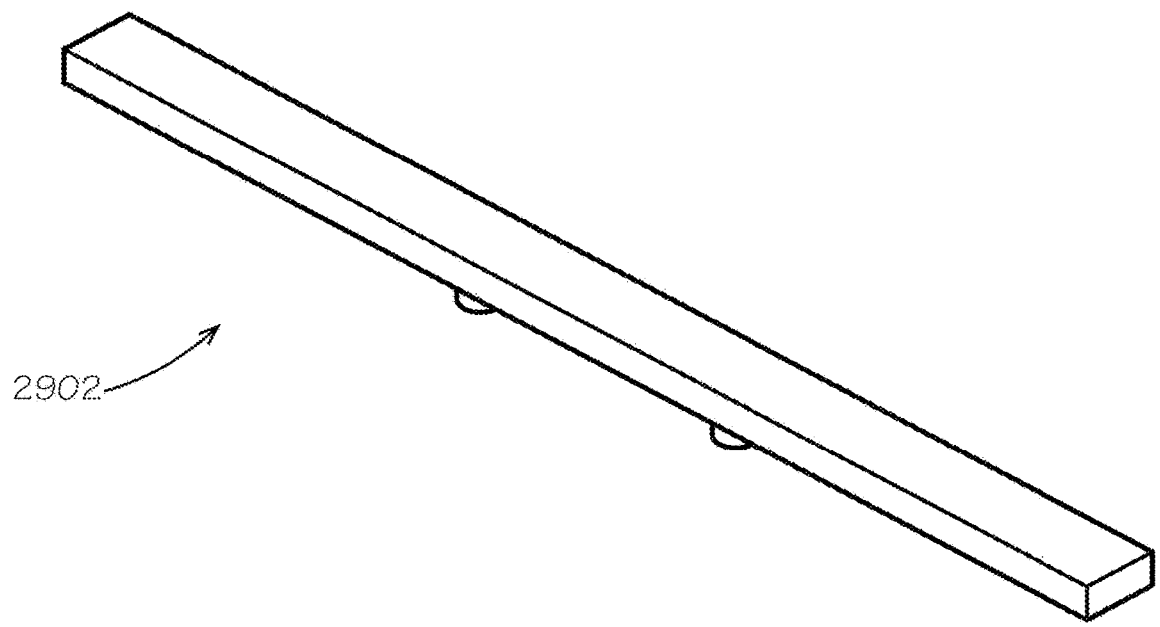
Figure 30:
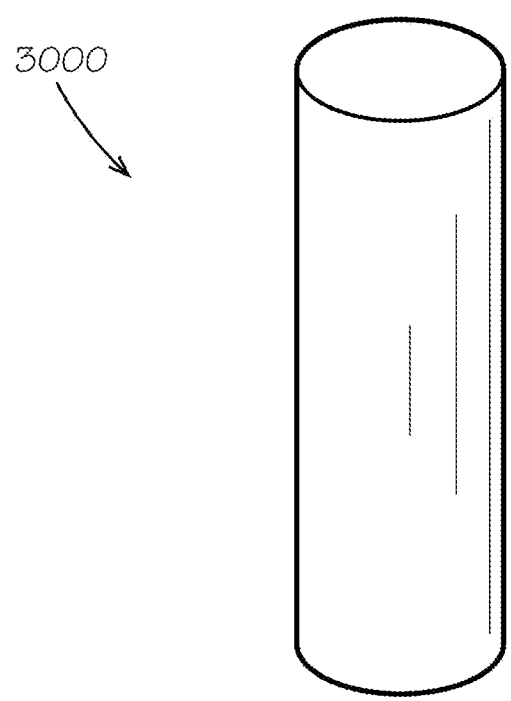
FIG. 30 illustrates an exemplary attachment pin for securing the lattice members of the module lattice panel of FIGS. 28A and 28B to each other.

The first or second lattice members may have, for example, a substantially square configuration (see, e.g., lattice panels 2017 in FIG. 28A) or a substantially rectangular configuration (see, e.g., lattice member 2817 in FIG. 28B).

Figure 21:
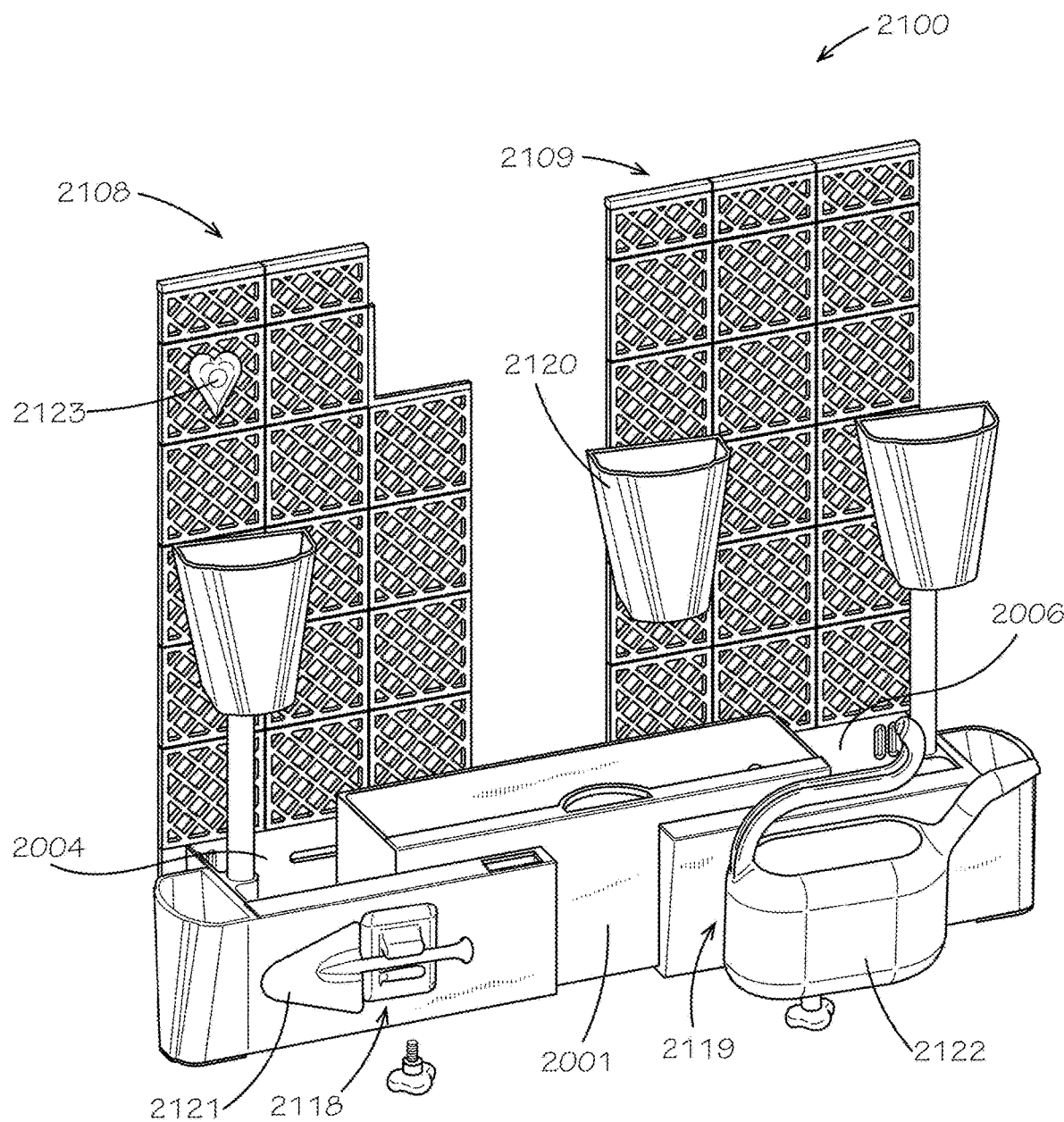
FIG. 21 is a front perspective view of another window planter according to aspects of the present disclosure.
Figure 22B:
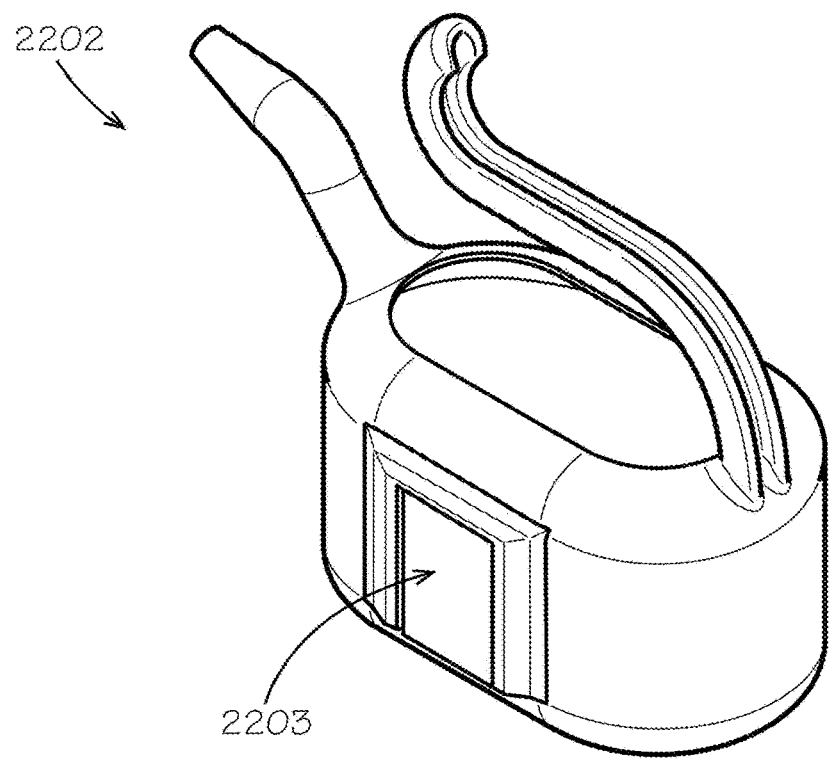
FIG. 22B illustrates an exemplary accessory that can be removably attached to the attachment bracket of FIG. 22A.
Figure 23A:
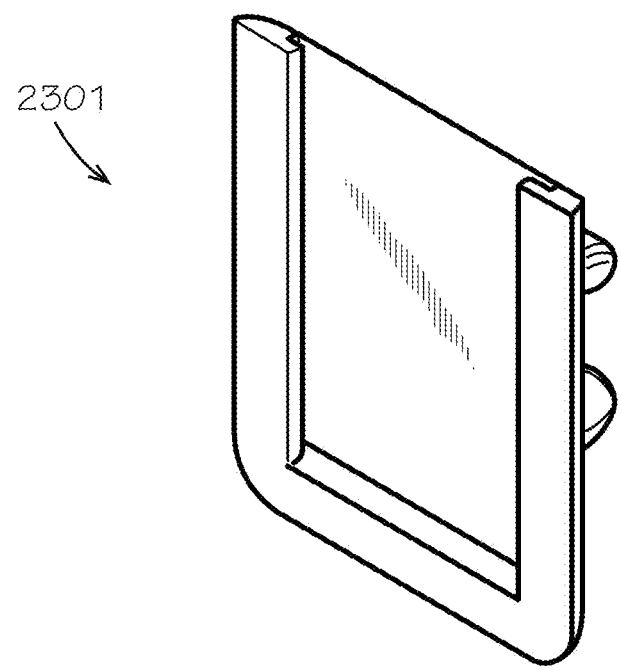
FIG. 23A is a rear perspective view of an accessory attachment bracket according to aspects of the present disclosure.
Figure 23B:
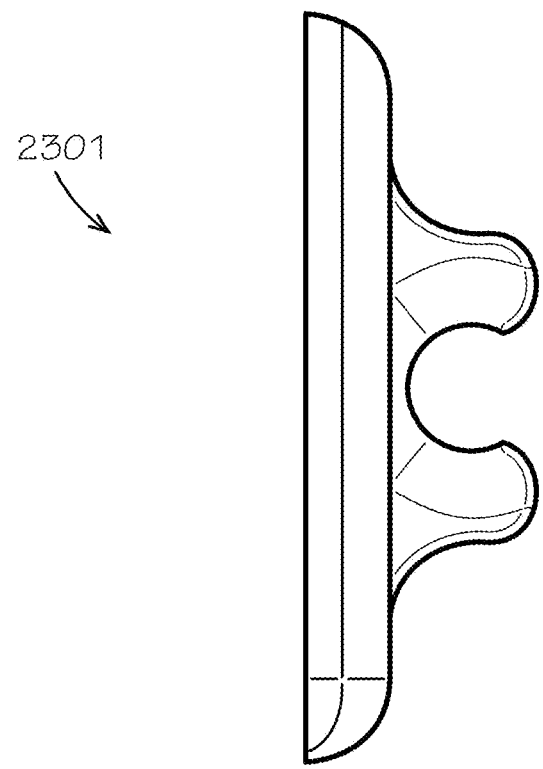
FIG. 23B is a top plan view of the accessory attachment bracket of FIG. 23A.
Figure 24:
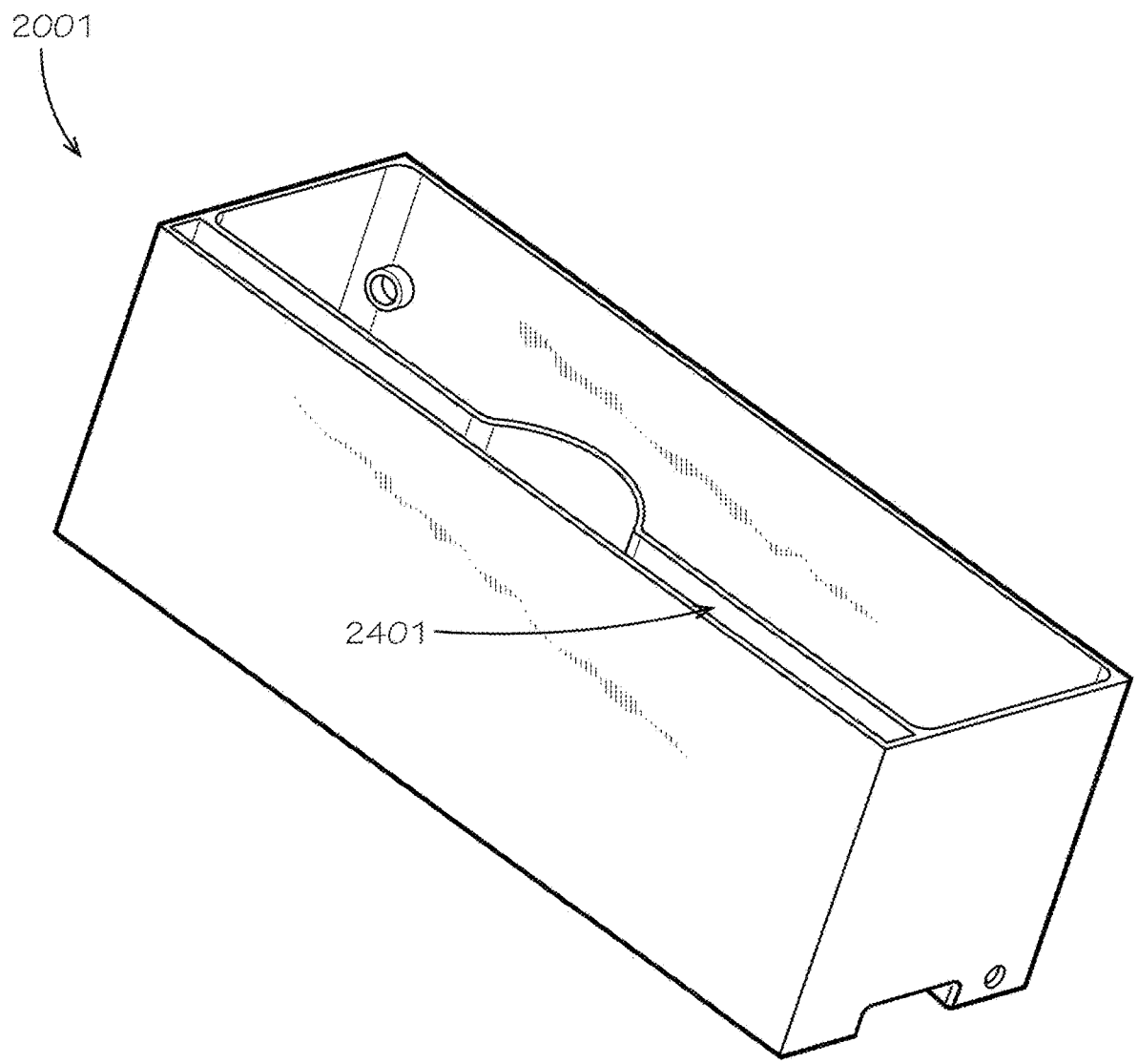
FIG. 24 is a front perspective view of a central compartment of the window planters of FIG. 20 or 21 according to aspects of the present disclosure.
Figure 25:
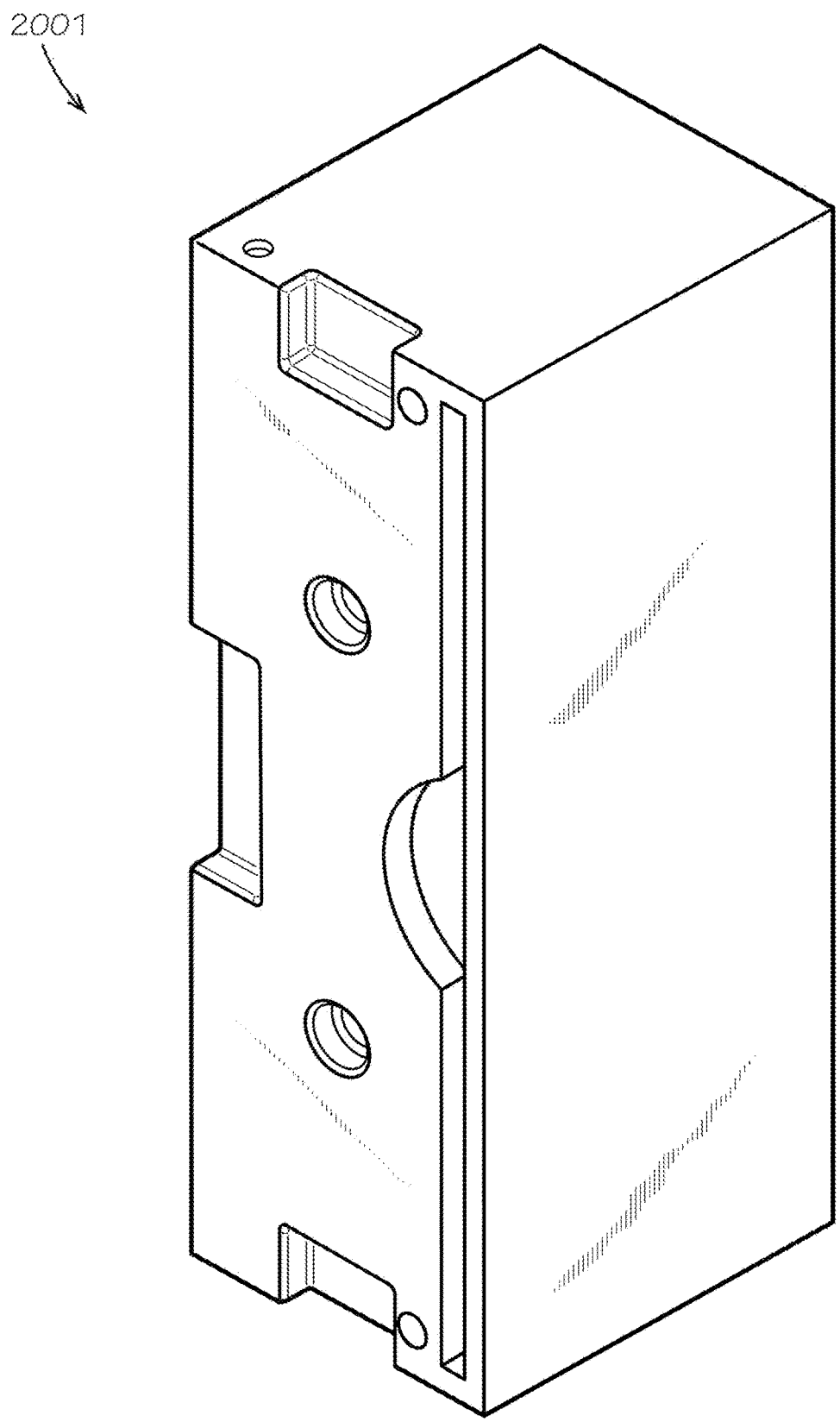
FIG. 25 is a bottom perspective view of the central compartment of FIG. 24.
Figure 26:
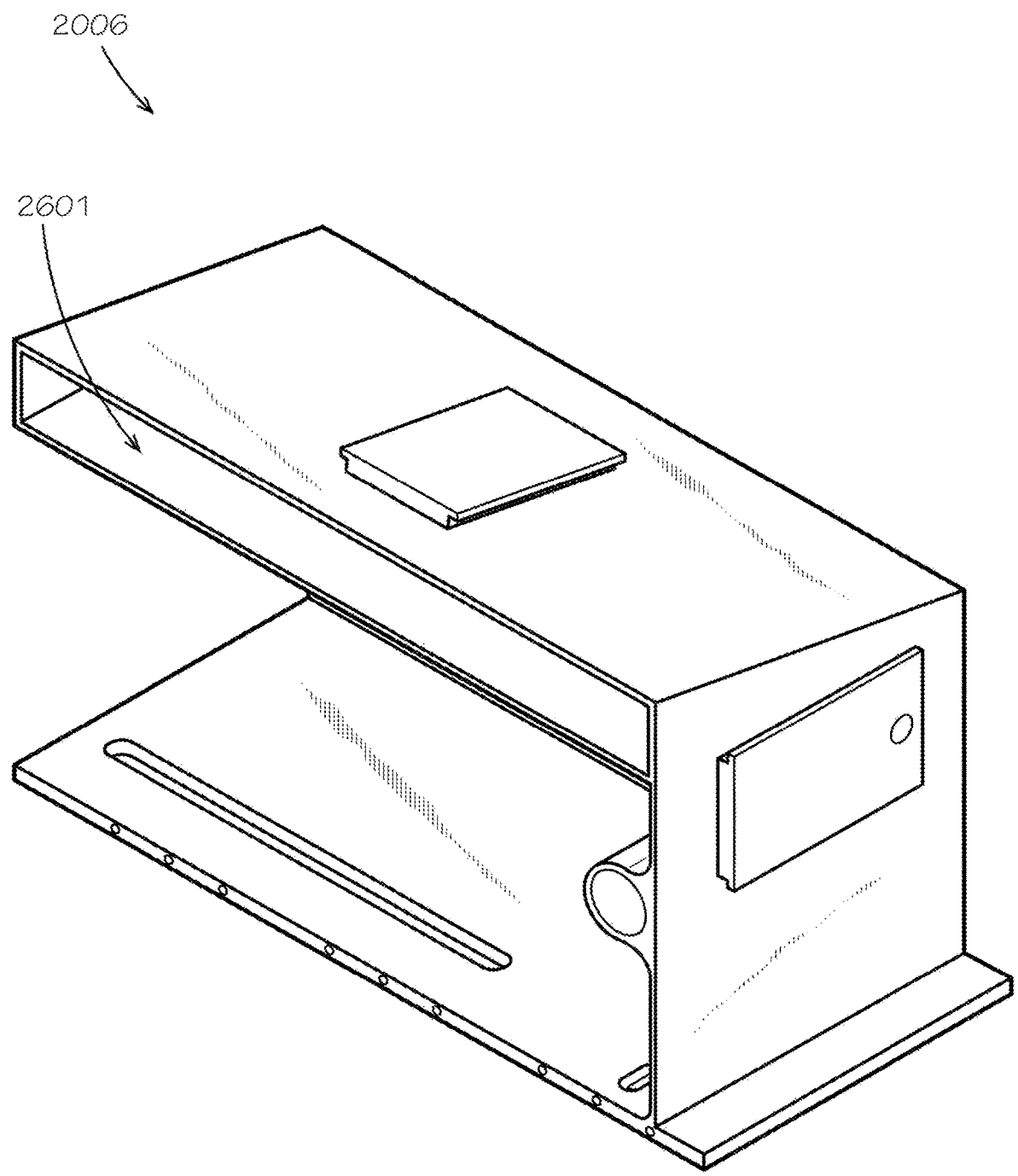
FIG. 26 is a top perspective view of a side compartment including front and side attachment brackets and slidably connectable with the central compartment of FIG. 24.
Figure 27:
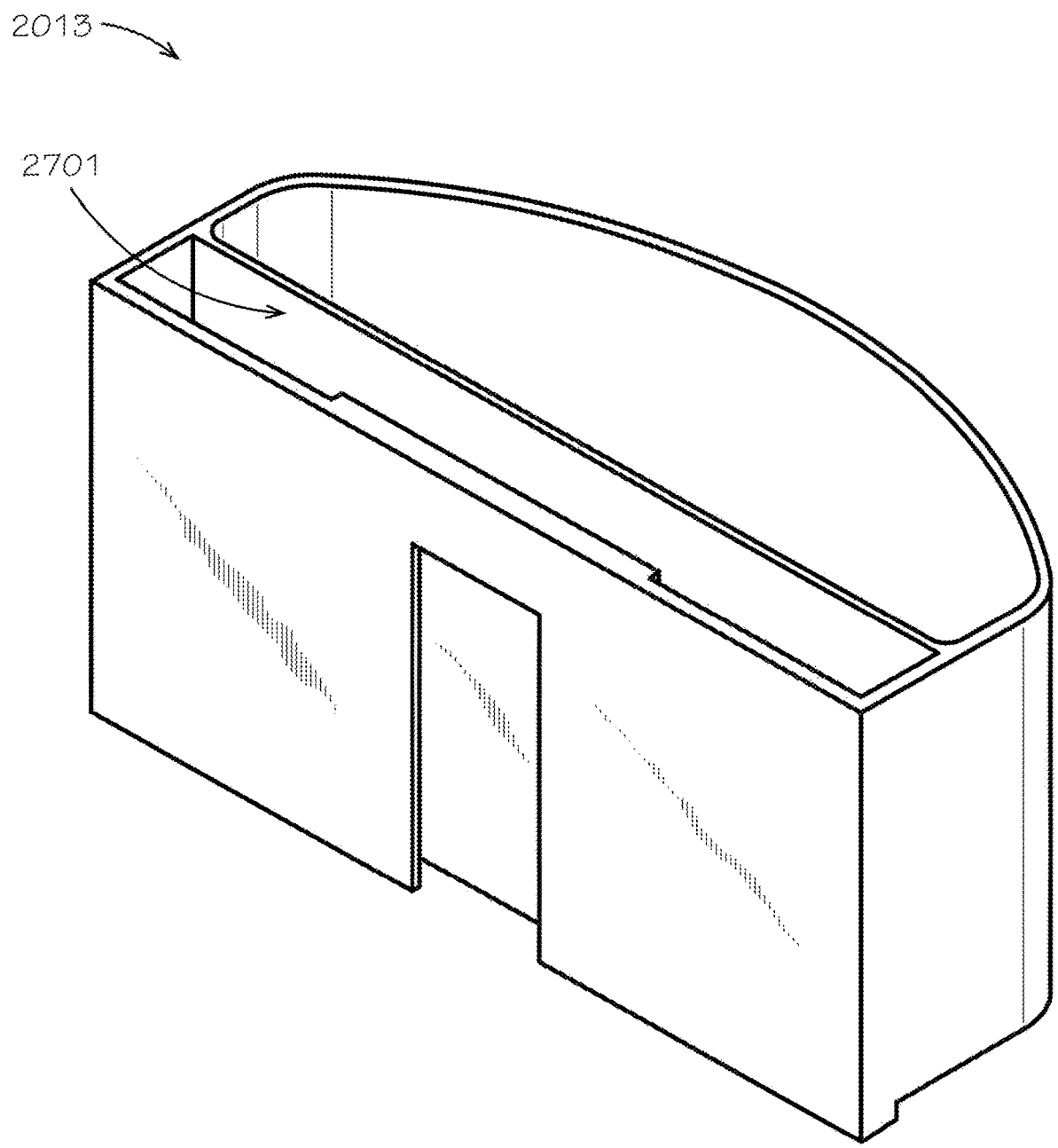
FIG. 27 is a rear perspective view of a front compartment including an attachment channel configured to mate with an attachment bracket of a side compartment of the window planters of FIG. 20 or 21 according to aspects of the present disclosure.

Referring to FIG. 21, first accessory attachment bracket 2118 is supported by the second compartment 2004. A second accessory attachment bracket 2119 may also be supported by the third compartment 2006. A first accessory 2121 (e.g., a shovel may be removably mounted to mounting bracket 2301 shown in FIGS. 23A and 23B) may be removably secured to the first accessory attachment bracket 2118 and a second accessory 2122 (e.g., a watering can shown in FIG. 22B with a slot 2203 configured to mate with one of mounting brackets 2201) may be removably coupled to the second accessory attachment brackets 2122.

In an aspect of the present disclosure, at least one floating compartment 2120 is removably coupled with the first lattice panel 2108 or the second lattice panel 2109. At least one decorative accessory 2123 may also be removably coupled with the first lattice panel 2108 or the second lattice panel 2109.

Referring to FIGS. 24-27, at least one of the first compartment 2001, second compartment 2004, the third compartment 2006, the first forward compartment 2013 or the second forward compartment 2014 includes a water reservoir (see, e.g., water reservoirs 2401, 2601 or 2701). The water reservoirs 2401, 2601 or 2701 may be substantially the same as the space 204 described above, and thus duplicative descriptions are omitted.

Referring to FIGS. 28A-30, the first lattice members (e.g., 2017 or 2817) each include first apertures 2801 and first pins 3000 disposed in the first apertures to secure the first lattice members to each other. The second lattice members each include substantially identical second apertures and second pins disposed in the second apertures to secure the second lattice members to each other.

In an aspect of the present disclosure, a top cap (e.g., 2901 or 2902) may be used to cap an upper end of the first or second lattice panels 2108 or 2109).

Various attachment mechanisms may be employed to attach a floating compartment, or any of the accessories described herein to a window planter, or to secure a lattice panel described herein to a window frame. For example, various hook and eye (e.g., Velcro® strips) may be employed as an attachment mechanism, as desired).

Unless otherwise indicated below, window planters 3100 and 3500 are substantially the same as the window planter described above with reference to FIGS. 1 to 30, and thus duplicative descriptions may be omitted below.

Figure 35:
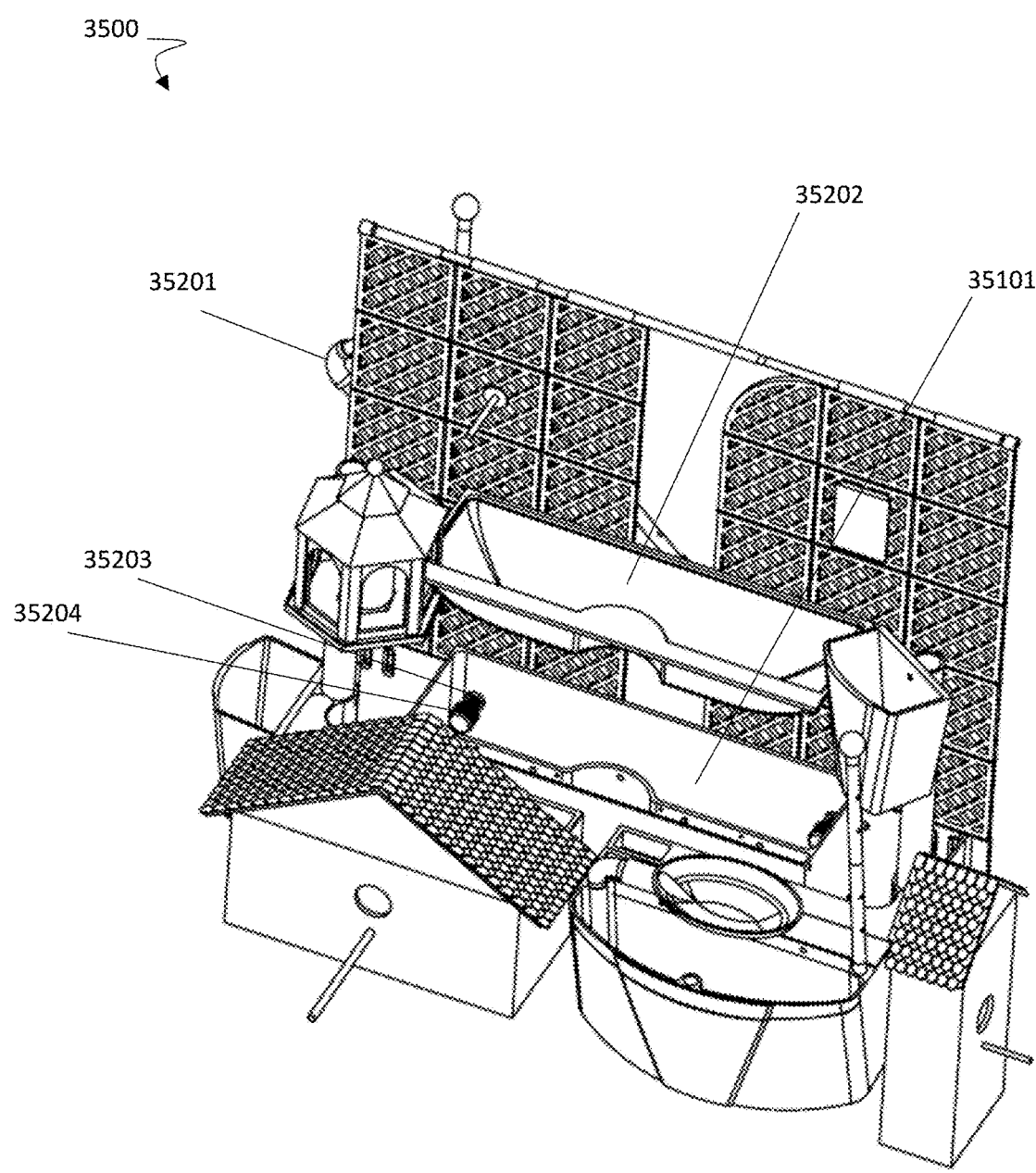
FIG. 35 is a front perspective view of another window planter according to aspects of the present disclosure.

Referring particularly to FIGS. 31-34, a window planter 3100 includes a bird house (e.g., 31201 or 31202), a bird feeder 31203, or a bird bath (see, e.g., bird bath 35202 in FIG. 35). The bird bath may be supported by the first compartment 31101, the second compartment 31104 or the third compartment 31106.

A projection 31204 may extend from the second compartment 31104 or the third compartment 31106, or from the first or second forward compartments (see, e.g., forward compartments 2013 or 2014). Another projection 31301 can support the bird house (e.g., bird house 31202), the bird feeder 31203, or a bird bath (see, e.g., bird bath 35202 in FIG. 35). For example, the bird house 31202 may be supported above the first compartment 31101, the second compartment 31104 and the third compartment 31106. Projection 31301 may be at least partially hollow and may be configured to hold water. Water may be fed into the projection 31301 by a wick connected with the second compartment 31104, raised compartment 2011, or the third compartment 31106. The projection 31301 may be in fluid communication with a raised compartment (e.g., raised compartment 2011). The projection(s) 31301, unless otherwise indicated, is the substantially the same as the projections supporting the raised planters (see, e.g., first elevated compartment 2011 in FIG. 20).

In an aspect of the present disclosure, a rod 31205 extends between the first lattice panel 31108 and the second lattice panel 31109. The rod 31205 secures the window planter 3100 to a window frame. As an example, the rod 31205 can be employed to secure the window planter 3100 to a window frame that lacks a screen channel, or to secure the window planter 3100 to a window frame with a screen channel. In use, if the rod 31205 is employed in a window frame with a screen channel distal ends of the rod 31205 would be positioned in the screen channel to secure the window planter 3100 to the window frame. The rod 31205 may be extendable and/or modular to varying widths (e.g., by adding a series of male/female portions of rod 31205 to each other to achieve a desired width). For example, the rod 31205 may be adjusted to varying widths approximating a width of a window frame by adding a series of modular male/female units and then telescoping to secure the rod 31205 firmly in place within the window frame. The rod 31205 may extend through a series of apertures 31206 defined at an upper end of the lattice panels 31108 and 31109. The rod 31205 may define an uppermost level and may serve as a cap of the first lattice panel 31108 and/or the second lattice panel 31109. Alternatively, the rod 31205 may be arranged at any height along the first lattice panel 31108 and the second lattice panel 31109. The apertures 31206 can be defined on rear surfaces of the second compartment 31104 or the third compartment 31106.

Attachment ports 31207 may be employed to secure the rod 31205 and correspondingly the window planter 3100 to a window frame. The attachment port(s) 31207 receive the rod 31205 to secure the rod 31205 to the window frame. As an example, the attachment port(s) 31207 may be open cylindrical cups that face each other, and each receive a respective end of the rod 31205 therein.

In an aspect of the present disclosure, one or more projections 31204 extend from the second compartment 31104, the third compartment 31106, or either of forward compartments 2013 or 2014 (see, e.g., FIG. 20). One or more of the projections 31204 may support an arm 31208 configured to support a portion of a plant positioned above the first compartment 31101, the second compartment 31104, the third compartment 31106 or the first or second forward compartments described herein. As an example, the arm 31208 may have a cup or spoon shape, and may include one or more apertures for drainage.

The projections 31204 can also support a decorative figure. The projections 31204 may each include a spherical ball at upper ends thereof.

The projections 31204 may each include at least one aperture 31209. Each aperture 31209 supports a plant growing above the first compartment 31101, the second compartment 31104, the third compartment 31106, or the first or second forward compartments described herein. As an example, a plurality of apertures 31209 may be arranged along a length of each projection 31204.

In an aspect of the present disclosure, a support frame 31210 is supported by the second compartment 31104 or the third compartment 31106. The support frame 31210 supports vertical growth of a climbing plant. As an example, the support frame 31210 may include three projections extending at upward angles with respect to one another.

In an aspect of the present disclosure, a bird perch 31211 extends from at least one of the lattice panels 31108 or 31109.

In an aspect of the present disclosure, at least one channel 31212 is arranged on or formed in the second compartment 31104 or the third compartment 31106. The channel 31212 slidably receives a support structure (see, e.g., support block 31213 described in more detail below) or an accessory (e.g., support frame 31210 or support frame 35201). Each Channel 31212 may extend in a vertical direction. The channel may be formed in a mounting bracket (see, e.g., mounting bracket 2301) that can be removably coupled with the second compartment 31104, the third compartment 31106, the first lattice panel 31108 and/or the second lattice panel 31109.

As an example, two channels 31212 can be formed on the rear surfaces of the second compartment 31104 and the third compartment 31106. A support block 31213 can be slidably received in each channel 31212. The support block 31213 is configured to be coupled with a wall or a window frame. In use, each support block 31213 can be secured to a wall, window frame, or other structure at a positioned and spacing configured to correspond with a channel and the window planter 3100 can then mounted by sliding each channel 31212 about each corresponding support block 31213. As an example, four support blocks 31213 and four corresponding channels 31212 may be employed.

Each support block 31213 may have a thickness greater than a thickness of a tightening knob (see, e.g., FIGS. 33A and 33B) of the second compartment 31104 or the third compartment 31106.

Figure 31:
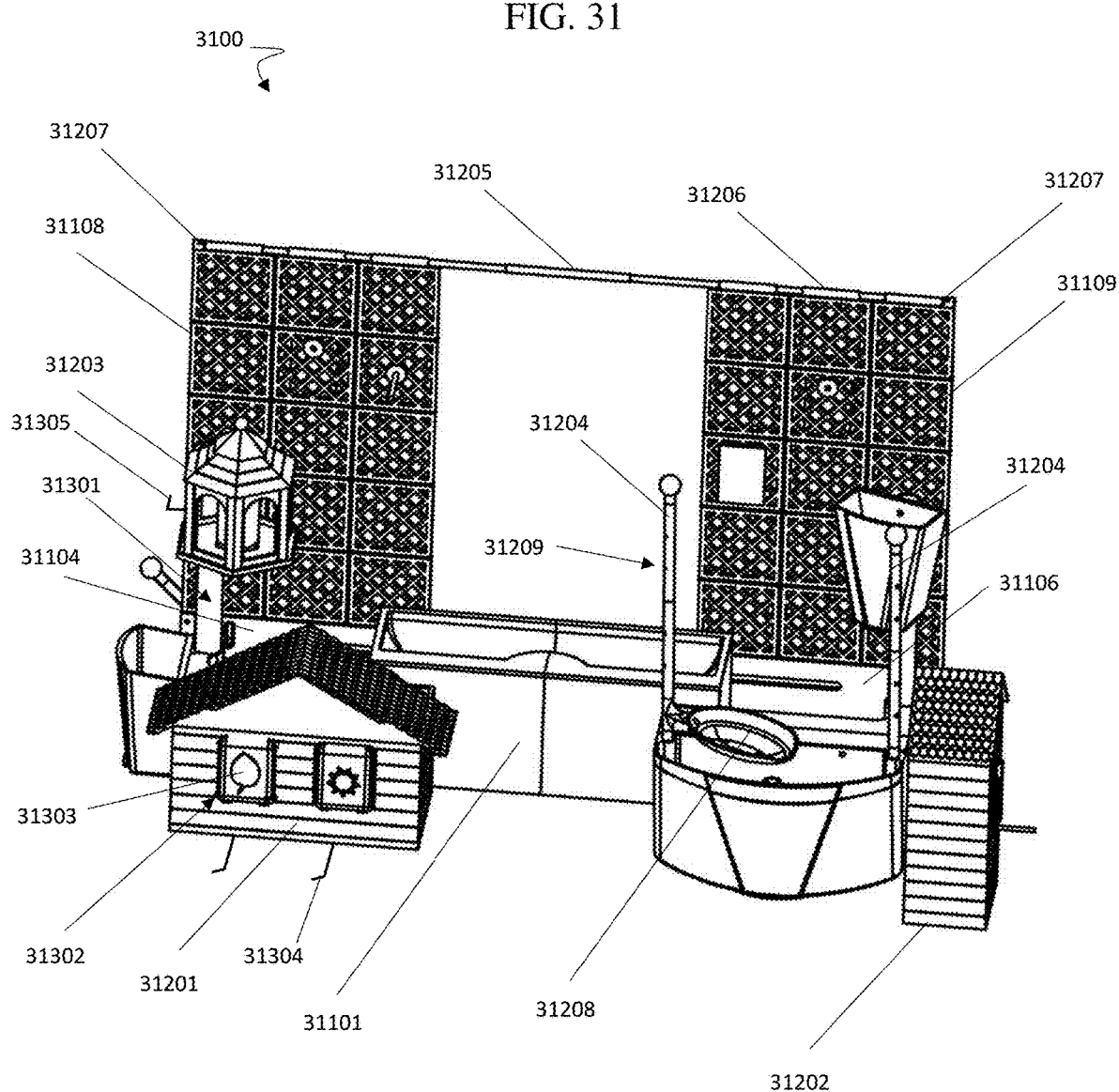
FIG. 31 is a front perspective view of another window planter according to aspects of the present disclosure.
Figure 33A:
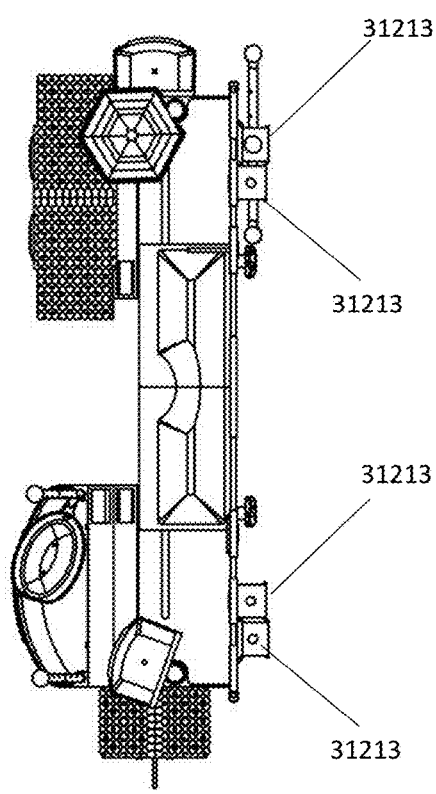
FIG. 33A is a top-down view of the window planter of FIG. 31.
Figure 33B:
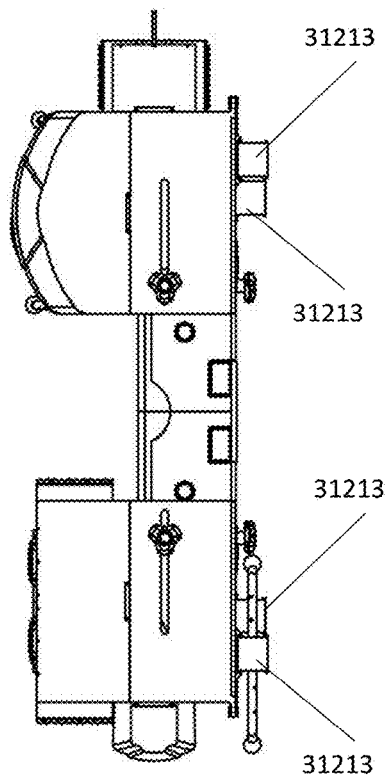
FIG. 33B is a bottom-up view of the window planter of FIG. 31.
Figure 34:
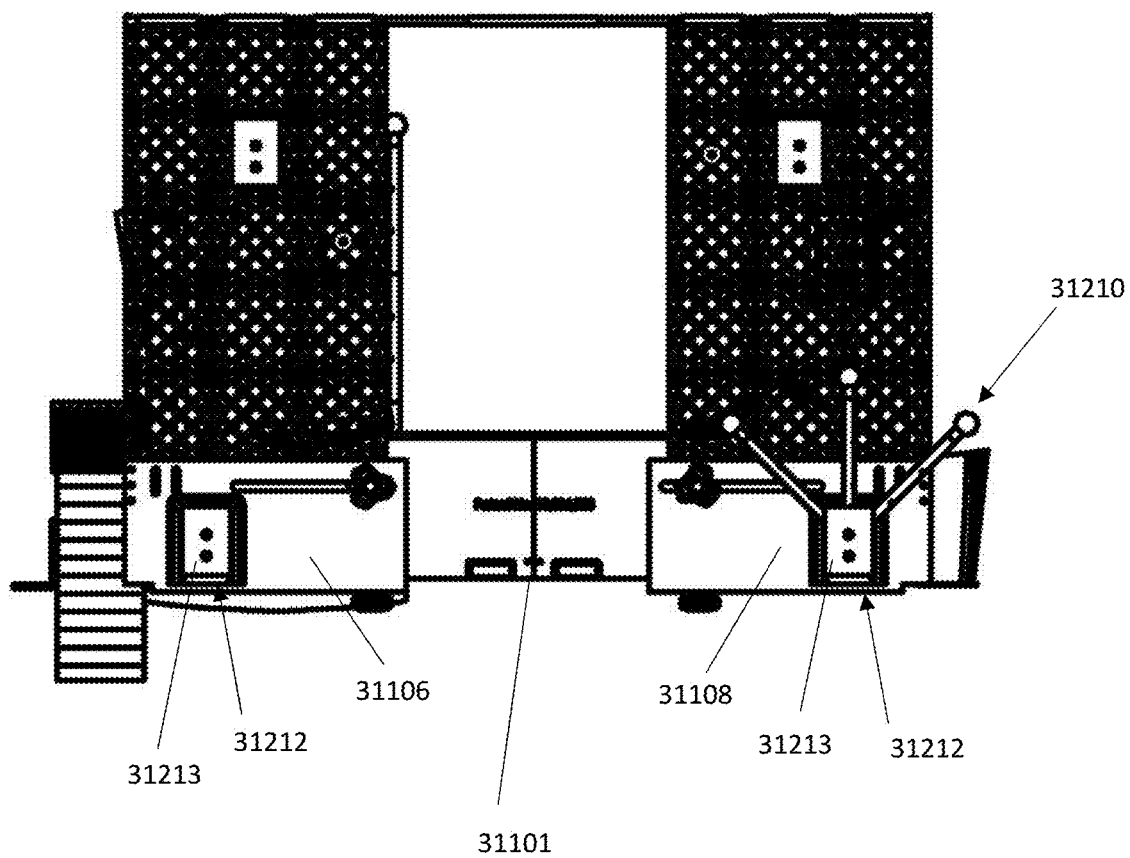
FIG. 34 is a rear view of the window planter of FIG. 31.

Referring particularly to FIG. 31, birdhouse 31201 may include at least one window or opening 31302 that can allow a bird to enter the birdhouse 31201. The opening 31302 can be selectively and removably covered by a panel 31303 arranged in a slot formed over the opening 31302. The birdhouse 31201 may include at least one hook 31304 configured to hold keys or another object that can be supported by the birdhouse 31201. The birdhouse 31201 can be mounted on a wall or other surface (e.g., by using support block 31213 and/or channel 31212).

The bird feeder 31203 may include at least one hook 31305 configured to hold a dangling food, such as a worm, for feeding birds and attracting birds to the bird feeder 31203.

Figure 36:
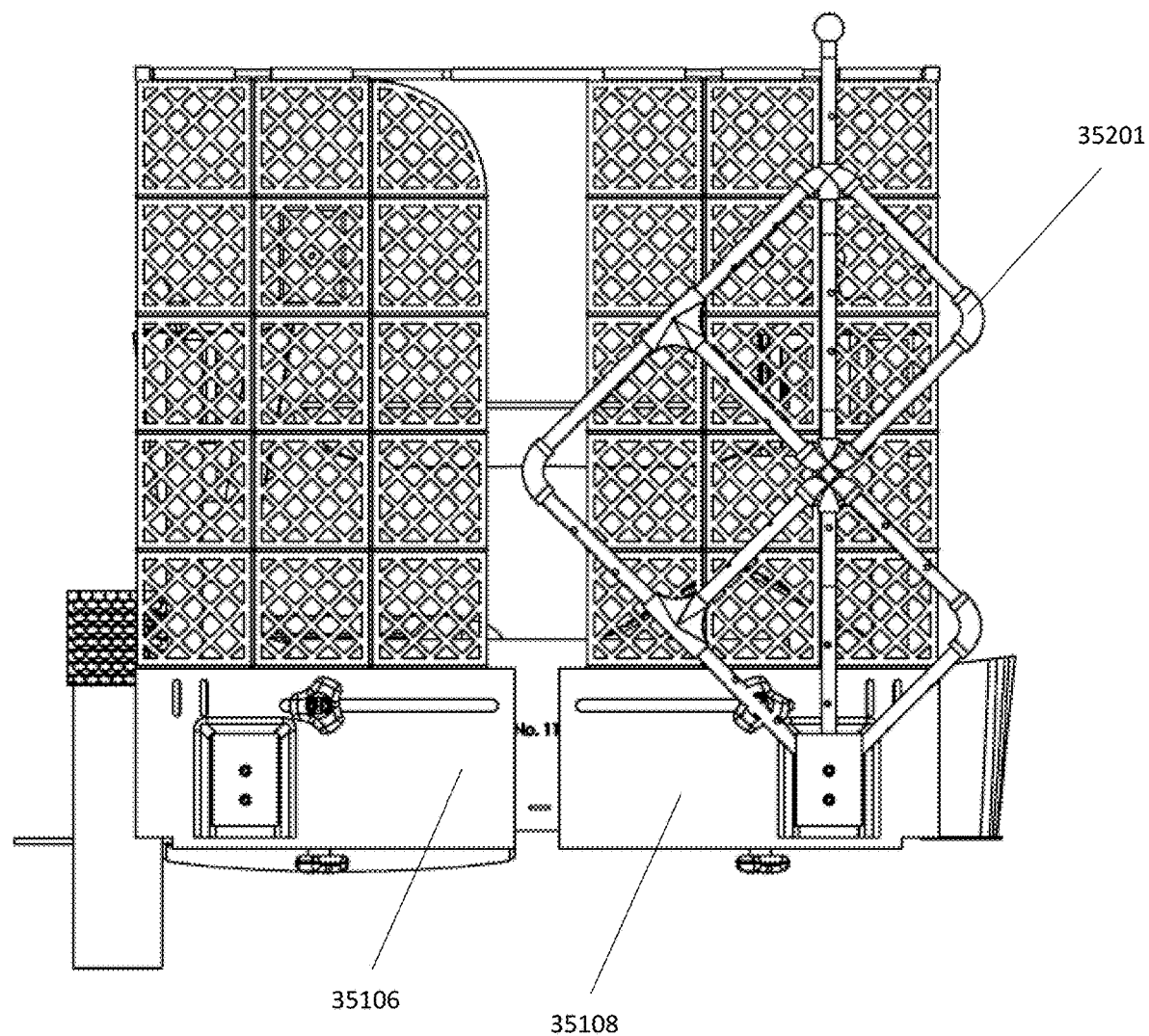
FIG. 36 is a rear view of the window planter of FIG. 35.

Referring particularly to FIGS. 35-36, window planter 3500 includes a support frame 35201 may be supported by the second compartment or the third compartment. The support frame 35201 supports vertical growth of a climbing plant.

In an aspect of the present disclosure, a bird bath 35202 can be removably positioned in the first compartment 35101.

Figure 37:
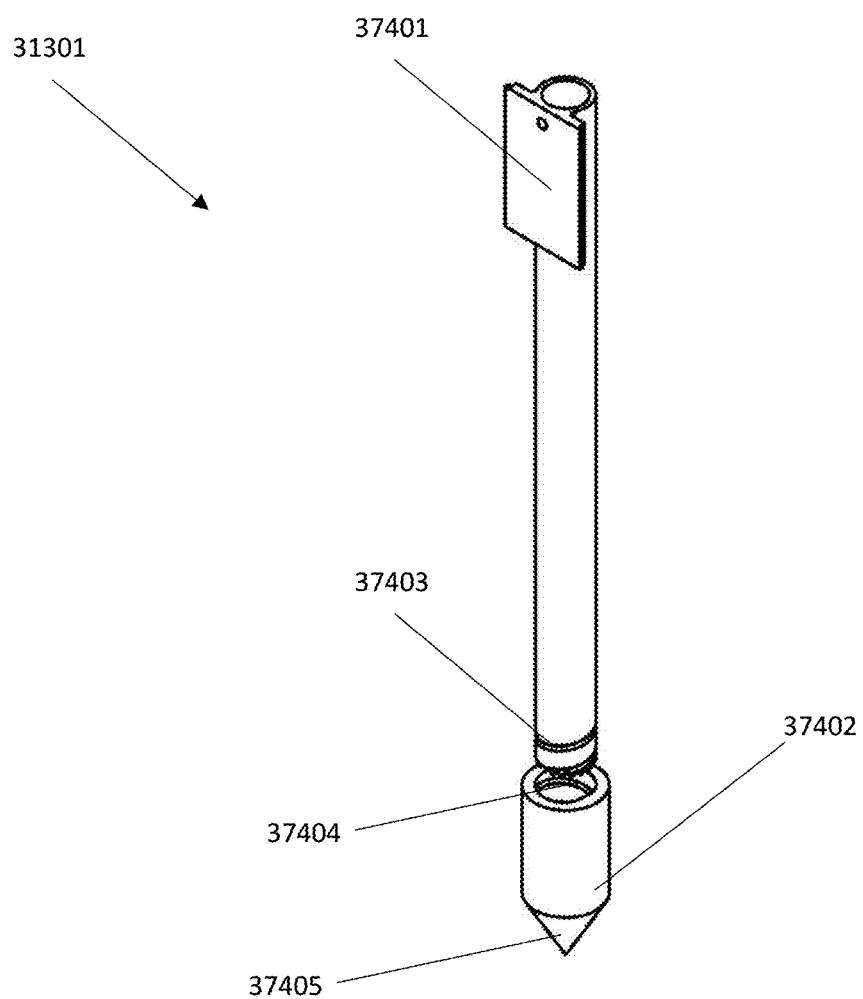
FIG. 37 illustrates a projection according to an aspect of the present disclosure.

Referring particularly to FIG. 37, projection 31301 according to an aspect of the present disclosure includes a plate 37401 configured to be inserted into a slot formed in an accessory (e.g., bird feeder 31203) to support the accessory (e.g., above the second compartment 31104 or the third compartment 31106). The projection 31301 may be inserted into or integrally formed with a stake 37402. The stake 37402 can be inserted into the ground or into an orifice defined in the second compartment 31104 or the third compartment 31106. However, the stake 37402 can be omitted and the projection 31301 can be inserted directly into an orifice defined in the second compartment 31104 or the third compartment 31106. The accessories described herein may be configured to receive electrical power (e.g., to power lights or moving parts of the accessories). The electrical power may be provided by a battery (e.g., a battery charged by a solar panel, as described herein), or directly by a solar panel, as described herein.

The projection 31301 may include a threaded portion 37403 configured to be threaded into a corresponding threaded portion 37404 of the stake 37402. The stake 37402 may define a pointed end 37405.

It should be noted that any of the compartments and/or accessories described herein can be mounted to a surface (e.g., a wall, to each other, indoors below a window or windowsill, or directly to a window frame) other than the window planters described herein. For example, any of the compartments may be mounted using a support block/channel system (see, e.g., support block 31213 and channel 31212). For example, a support block can be secured to any desired surface and may be received in a channel formed on or coupled with the compartment or accessory to support the compartment or accessory.

Each of the compartments described herein may include a drip pan arranged below a bottom surface of the corresponding compartment. The drip pans can catch water dripping through apertures in the bottom of a particular compartment, thus preventing root rot in any plants planted in the corresponding compartment.

Any of the bird houses described herein (e.g., bird house 31202) can include a removable roof and an aperture on a rear surface thereof to create cross ventilation in the bird house.

Any of the window planters described herein may include at least one speaker or at least one music module configured to transmit an auditory signal to another speaker. As an example, a speaker included in the window planter may be connected with a music player or music module through a Bluetooth, wifi or wired connection. The window planter may include one or more security cameras. A plurality of security cameras may be supported by the window planter and may be connected with each other (e.g., wirelessly or through a wired connection). As an example, the window planter may include a music compartment and/or a speaker compartment configured to house a speaker or camera. The speaker, music system, or camera may be powered by a battery, by solar panels, or by a batter charged by the solar panels, as described herein.

Referring particularly to FIG. 35, each bolt 35203 extending through the first compartment 35101 may include a bolt cap 35204, which may be threadably engaged about a corresponding bolt 35203. The bolt cap(s) 35204 prevents the bolt(s) 35203 from unwinding after being tightened to a desired position. The bolt 35203 and/or bolt cap 35204 can support the false bottom 201 (see, e.g., FIG. 7) above a bottom surface of the first compartment 35101, and thus the legs of the false bottom 201 may be omitted.

Figure 38A:
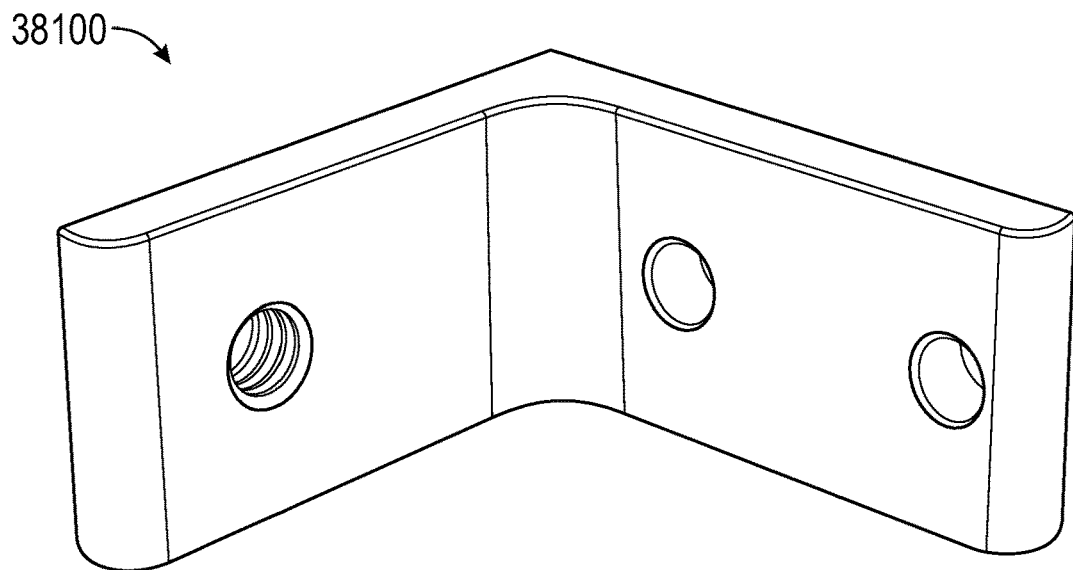
FIG. 38A illustrates an exemplary hinge bracket according to an aspect of the present disclosure.
Figure 38B:
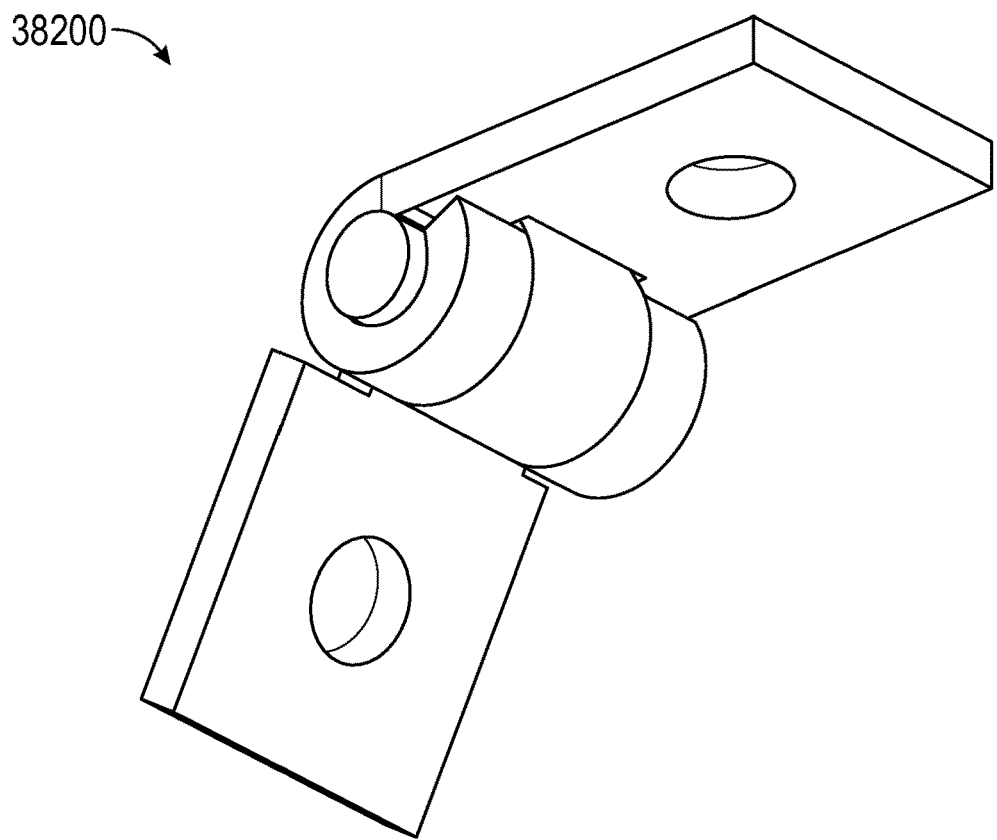
FIG. 38B illustrates another exemplary hinge bracket according to an aspect of the present disclosure.

Referring particularly to FIGS. 38A and 38B, a hinge bracket 38100 or 38200 can be employed for coupling a window planter, as described herein, to a window frame. For example, the hinge bracket 38100 or 38200 can be employed in a window frame lacking a window channel. As an example, the hinge bracket 38100 or 38200 can be secured to an overhang of a window planter, and to a window frame to secure the window planter in a desired position.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A window planter, comprising:
    a first compartment including a first sidewall and a second sidewall, the first compartment configured to house a first group of plants;
    a second compartment slidably coupled to the first compartment, the second compartment including a first outer sidewall, the second compartment configured to house a second group of plants separated from the first group of plants by the first sidewall of the first compartment;
    a third compartment slidably coupled to the first compartment, the third compartment including a second outer sidewall, the third compartment configured to house a third group of plants separated from the first group of plants by the second sidewall,
    wherein at least the second compartment or the third compartment is configured to be secured to a window frame;
    at least one of a bird house, a bird feeder, or a bird bath supported by the second compartment or the third compartment; and
    at least one projection extending from the second compartment or the third compartment, the at least one projection supporting the at least one of the bird house, the bird feeder, or the bird bath.

2. The window planter of claim 1, further including a first lattice panel extending from the second compartment, and a second lattice panel extending from the third compartment.

3. The window planter of claim 2, wherein the first lattice panel is a first modular panel including a first plurality of lattice members, and wherein the second lattice panel is a second modular panel including a second plurality of lattice members.

4. The window planter of claim 2, further including a rod extending between the first lattice panel and the second lattice pane, the rod configured to be secured to the window frame.

5. The window planter of claim 4, wherein the rod is modular or extendable to varying widths.

6. The window planter of claim 5, further including at least one attachment port configured to be secured to the window frame, the at least one attachment port configured to receive the rod to secure the rod to the window frame.

7. The window planter of claim 1, further including at least one projection extending from a first forward compartment, a second forward compartment, the second compartment or the third compartment, the at least one projection supporting an arm configured to support a portion of a plant positioned above the first compartment, the second compartment, or the third compartment.

8. The window planter of claim 1, further including at least one projection extending from a first forward compartment, a second forward compartment, the second compartment or the third compartment, the at least one projection supporting a decorative figure.

9. The window planter of claim 1, further including at least one projection extending from a first forward compartment, a second forward compartment, the second compartment or the third compartment, the at least one projection including at least one aperture formed therein, the at least one aperture configured to support a plant growing above the first compartment, the second compartment, or the third compartment.

10. The window planter of claim 1, further including at least one support frame supported by the second compartment or the third compartment, the at least one support frame configured to support vertical growth of a climbing plant.

11. The window planter of claim 1, further including:
at least one lattice panel extending from the second compartment or the third compartment; and
at least one bird perch extending from the at least one lattice panel.

12. The window planter of claim 1, further including at least one channel arranged on the second compartment or the third compartment, the at least channel configured to slidably receive a support structure or an accessory therein.

13. The window planter of claim 1, further including a support assembly configured to secure the window planter to a wall or the window frame, the support assembly including:
at least one channel arranged on a rear surface of the second compartment or the third compartment; and
a support block configured to be slidably received in the at least one channel, the support block configured to be coupled with the wall or the window frame.

14. The window planter of claim 13, wherein the support block has a thickness greater than a thickness of a tightening knob of the second compartment or the third compartment.

15. The window planter of claim 13, further including:
at least one lattice panel extending from the second compartment or the third compartment; and
at least one support block supported by the at least one lattice panel, the at least one support block configured to be coupled with the wall or the window frame.

16. The window planter of claim 1, further including a bird bath configured to be removably positioned in the first compartment.

17. The window planter of claim 1, further including a projection extending from the second compartment or the third compartment, wherein the bird feeder is supported by the projection above the second compartment or the third compartment.

18. A window planter, comprising:
a first compartment including a first sidewall and a second sidewall, the first compartment configured to house a first group of plants;
a second compartment slidably coupled to the first compartment, the second compartment including a first outer sidewall, the second compartment configured to house a second group of plants separated from the first group of plants by the first sidewall of the first compartment;
a third compartment slidably coupled to the first compartment, the third compartment including a second outer sidewall, the third compartment configured to house a third group of plants separated from the first group of plants by the second sidewall,
wherein at least the second compartment or the third compartment is configured to be secured to a window frame; and
at least one of a bird house, a bird feeder, or a bird bath supported by the second compartment or the third compartment,
wherein the bird house is supported on a front surface of the second compartment or the third compartment.

19. A window planter, comprising:
a first compartment including a first sidewall and a second sidewall, the first compartment configured to house a first group of plants;
a second compartment slidably coupled to the first compartment, the second compartment including a first outer sidewall, the second compartment configured to house a second group of plants separated from the first group of plants by the first sidewall of the first compartment;
a third compartment slidably coupled to the first compartment, the third compartment including a second outer sidewall, the third compartment configured to house a third group of plants separated from the first group of plants by the second sidewall,
wherein at least the second compartment or the third compartment is configured to be secured to a window frame; and
at least one of a bird house, a bird feeder, or a bird bath supported by the second compartment or the third compartment,
wherein the bird house is supported on a side surface of the second compartment or the third compartment.

* * * * *